United States Patent
Kim et al.

(10) Patent No.: US 7,123,555 B2
(45) Date of Patent: Oct. 17, 2006

(54) INFORMATION RECORDING MEDIUM

(75) Inventors: Dae Young Kim, Seoul (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/841,519

(22) Filed: May 10, 2004

(65) Prior Publication Data

US 2004/0218490 A1    Nov. 4, 2004

Related U.S. Application Data

(60) Division of application No. 09/791,758, filed on Feb. 26, 2001, now Pat. No. 6,914,856, which is a continuation-in-part of application No. 09/134,368, filed on Aug. 14, 1998, now Pat. No. 6,208,614.

(30) Foreign Application Priority Data

Aug. 16, 1997  (KR) .................................. 97-39054
Nov. 1, 1997   (KR) .................................. 97-57619

(51) Int. Cl.
     *G11B 7/00* (2006.01)
(52) U.S. Cl. ............... 369/47.1; 369/47.19; 369/47.21; 369/47.22; 369/47.27
(58) Field of Classification Search ............. 369/44.26, 369/275.3, 44.13, 47.1, 47.27, 47.28, 47.21, 369/47.22, 47.19
See application file for complete search history.

(56) References Cited

U.S. PATENT DOCUMENTS 5,848,050 A * 12/1998 Nagasawa et al. ....... 369/275.4
5,896,365 A    4/1999  Hiroki
5,936,933 A    8/1999  Miyamoto et al.
6,064,643 A    5/2000  Tanoue et al.
6,069,870 A    5/2000  Maeda et al.
6,088,307 A    7/2000  Fushimi et al.
6,167,022 A *  12/2000 Ishida et al. ............. 369/275.3
6,400,660 B1   6/2002  Lee et al.
6,564,009 B1   5/2003  Owa et al.
6,621,772 B1 * 9/2003  Asano et al. ............ 369/44.26

FOREIGN PATENT DOCUMENTS

| JP | 9-120854 | 5/1997 |
| JP | 9-219024 | 12/1998 |
| JP | 11-007660 | 1/1999 |
| WO | WO 98/54703 | 3/1998 |

* cited by examiner

*Primary Examiner*—Nabil Hindi
(74) *Attorney, Agent, or Firm*—Birch, Stewart, Kolasch & Birch, LLP

(57) ABSTRACT

A recording medium is provided, which maximizes the recording capacity and simplifies the configuration of an information recording/reproducing apparatus including a pickup. In the medium, different types of wobbling signals are preformatted in each of the adjacent land and groove signal tracks. A same-phase wobbling signal provided by wobbling each side of the respective land and groove signal tracks in the same phase, and a different-phase wobbling signal provided by wobbling each side of the respective land and groove signal tracks in a different phase are used as the different types of wobbling signals. The physical positions of all the land and groove signal tracks are indicated by the same-phase wobbling signal.

14 Claims, 20 Drawing Sheets

LAND/GROOVE CROSS PORTION

INFORMATION RECORDING MEDIUM

CROSS REFERENCE

The present application is a divisional of U.S. patent application Ser. No. 09/791,758 filed on Feb. 26, 2001 (now U.S. Pat. No. 6,914,856 B2, issued Jul. 5, 2005) which is a continuation in part of U.S. patent application Ser. No. 09/134,368 filed Aug. 14, 1998 (now U.S. Pat. No. 6,208,614), for which priority is claimed under 35 U.S.C. § 120; and the present application claims priority of patent application Ser. No. 1997-39054 filed in Republic of Korea on Aug. 16, 1997 and patent application Ser. No. 1997-57619 filed in Republic of Korea on Nov. 1, 1997, under 35 U.S.C. § 119. The entire content of each of these applications are herein fully incorporated by reference.

BACKGROUND OF THE INVENTION

1. Field of the Invention

This invention relates to a recording medium having land and groove tracks, and more particularly to a recording medium that is adapted to record information on both the land tracks and the groove tracks.

2. Description of the Prior Art

Recently, an optical recording medium, an optical magnetic recording medium and so on have been developed as a recording medium for recording various information such as video and audio information, etc. and are commercially available in the market. Such an optical recording medium includes a read-only type disc such as CD, CD-ROM, DVD-ROM, etc., a write-once-read-many type disc such as CD-R, DVD-R, etc., and a rewritable type disc such as CD-RW, DVD-RAM, etc.

In the conventional rewritable disc, it is previously recorded an identified (hereinafter "ID") information including an address (or position) information allowing an information to be recorded in the desired position. Actually, the optical disc such as CD-R, etc., as shown FIG. 1, includes a land and groove signal tracks 10 and 12 formed thereon. Also, the ID information including the address information, etc. is preformatted on the optical disc by wobbling the groove track 12 in accordance with a carrier which the ID information is frequency-modulated. The address information can be obtained from a wobbling signal picked-up from the wobbled groove signal track 12 and the information can be recorded at the desired position on the disc by the obtained address information. In the optical disc having such structure, a recording capacity is limited because the information is recorded on only the groove track 12.

Also, an optical disc such as DVD-R and so on, as shown FIG. 2, is known as the information can be recorded on all of land and groove signal tracks 10 and 12. The optical disc comprises a header field having the ID information of address information, etc. recorded in a pre-pit train and a recording field consisting of any one of the land and groove signal track 10 and 12 wobbled in the same phase. In this disc, since the information can be not recorded on the header field consisting of the pre-pit train, the recording capacity is limited. As described above, the prior recording medium make to decrease an amount of information to be recorded on recordable area.

SUMMARY OF THE INVENTION

Accordingly, it is an object of the present invention to provide a recording medium that is capable of increasing an amount of recordable information.

It is other object of the present invention to provide a recording medium that is capable of maximizing an amount of information to be recorded on all of the land and groove signal tracks.

It is another object of the present invention to provide an information recording and reproducing apparatus that is capable of performing information record and reproduction for the above recording medium.

In order to achieve this and other objects of the invention, a recording medium according to an aspect of the present invention includes a signal track being wobbled in a predetermined frequency and having first and second wobbling areas. First wobbling area comprises a readable identified information, while second wobbling area has a non-readable identified information. Also, first and second wobbling areas is alternatively arranged.

An optical disc according to another aspect of the present invention includes a land track, a groove track alternated frequently with the land track, and a land/groove transition information including a mirror pattern.

An apparatus for recording and reproducing an information on an optical disc according to another aspect of the present invention includes: means for detecting a land/groove transition information on the optical disc having a land and groove tracks alternated in a predetermined track period, the land/groove transition information indicating a land/groove cross position between any one of the land and groove tracks and the another track; and a servo motor unit, responsive to the land/groove transition information, for controlling a servo motor and for inverting a tracking error signal in the polarity, the tracking error signal forcing a light beam on the optical disc to be traced to a center line of the land and groove tracks.

BRIEF DESCRIPTION OF THE DRAWINGS

This and other objects of the invention will be apparent from the following detailed description of the embodiments of the present invention with reference to the accompanying drawings, in which.

DETAILED DESCRIPTION OF THE PREFERRED EMBODIMENTS

Figure 3:
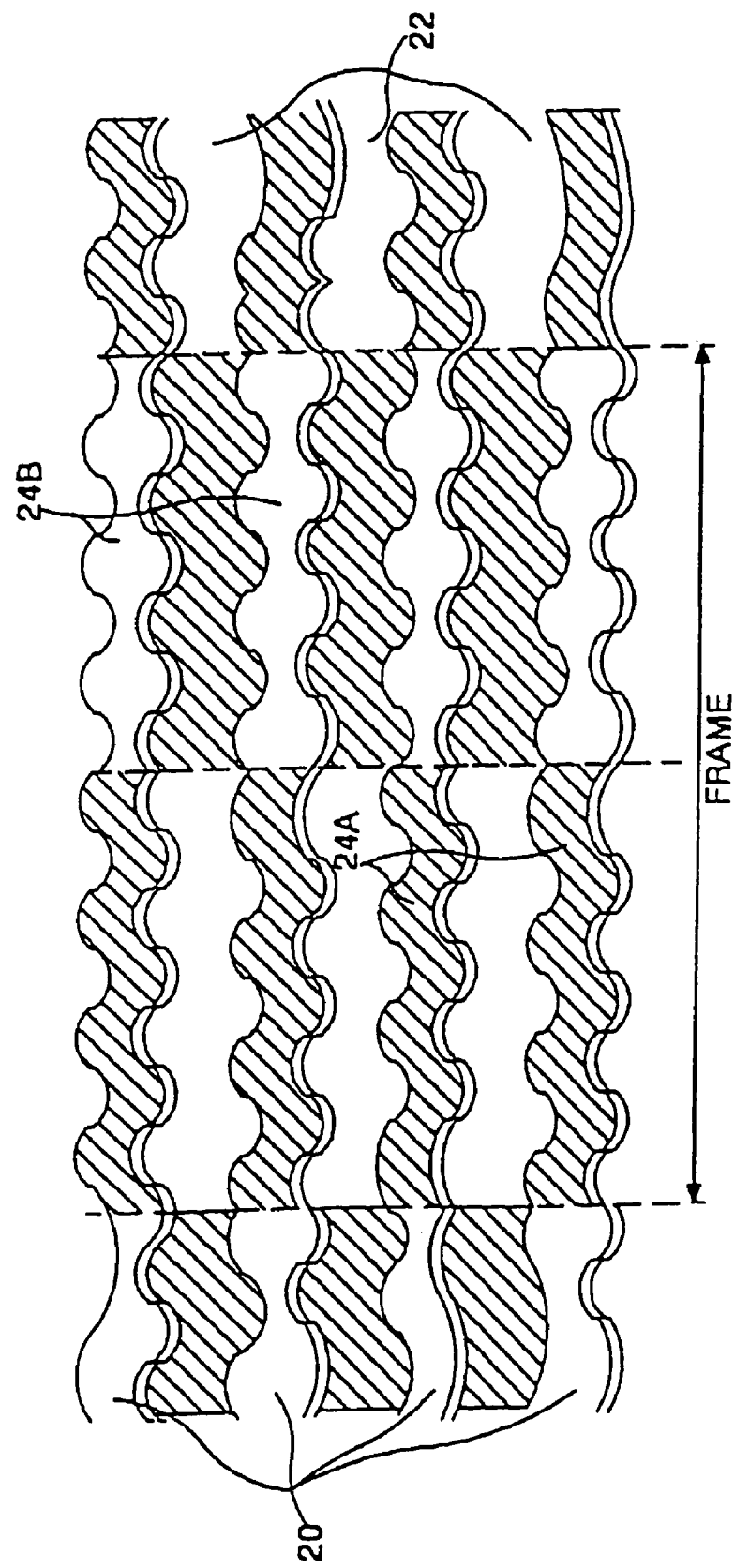
FIG. 3 is a schematic view showing a signal track structure of an optical disc according to an embodiment of the present invention.
Figure 4:
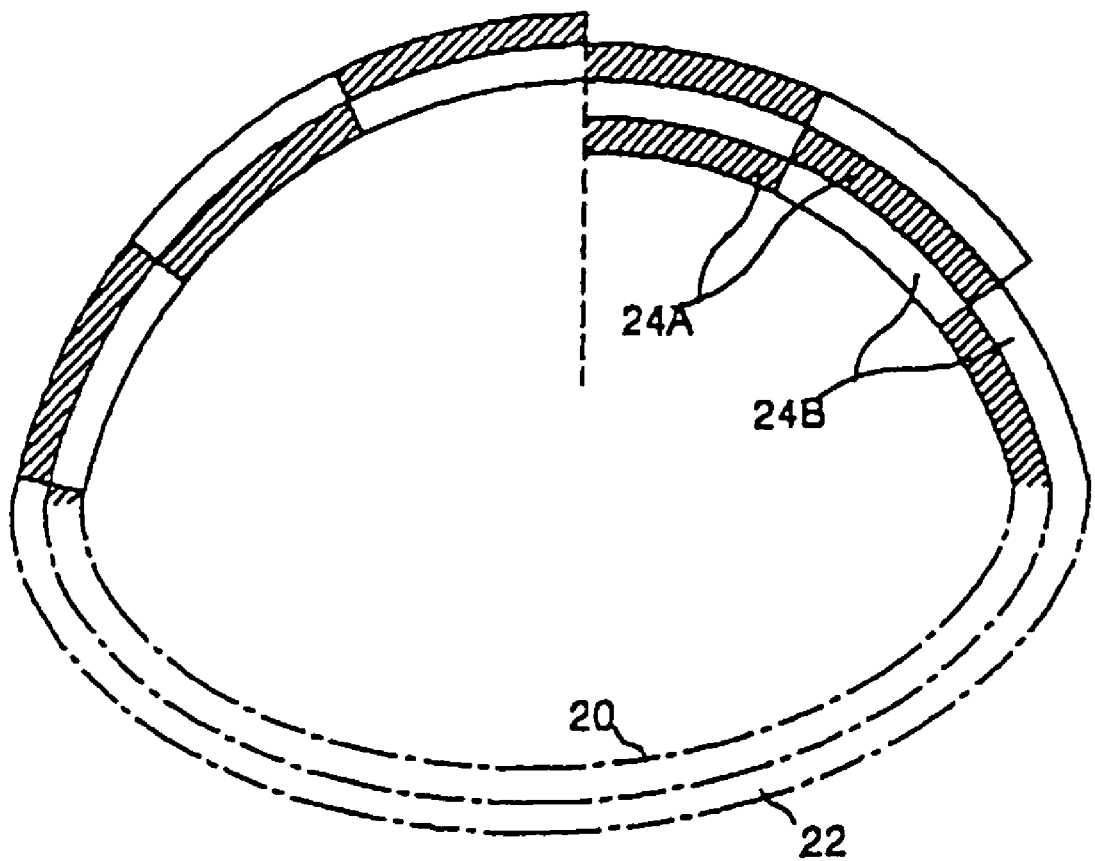
FIG. 4 is a schematic view showing a signal track structure of a two-spiral type optical disc according to an embodiment of the present invention.
Figure 5:
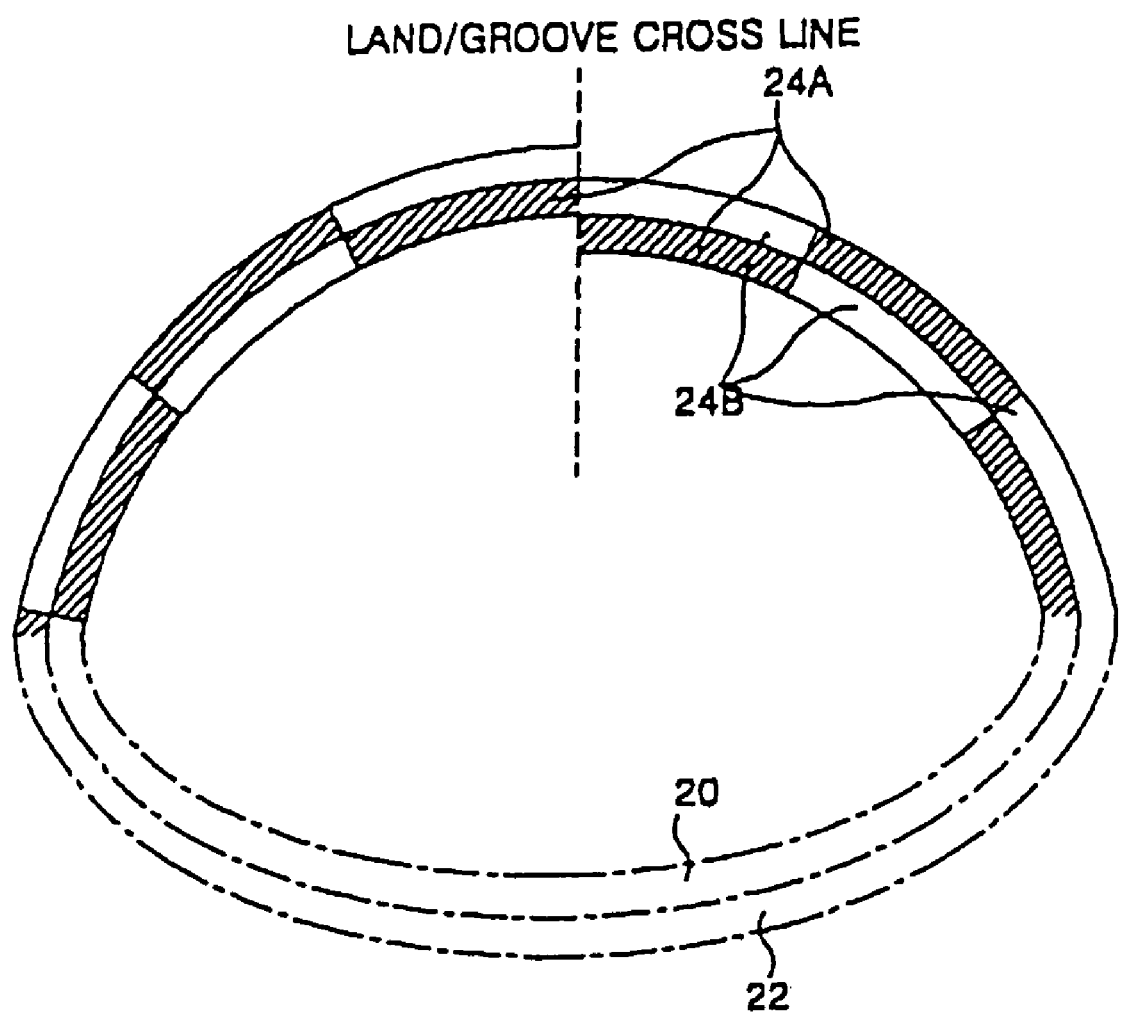
FIG. 5 is a schematic view showing a signal track structure of a one-spiral type optical disc according to an embodiment of the present invention.

Referring to FIG. 3, there is shown an optical disc according to an embodiment of the present invention having land and groove signal tracks 20 and 22. The land and groove signal tracks 20 and 22 are defined in parallel in a spiral pattern from the innermost circumference to the outermost circumference of the optical disc as shown in FIG. 4, or arranged alternately every rotation period from the innermost circumference to the outermost circumference in such a manner to form one spiral signal track as shown in FIG. 5. Each of land and groove signal tracks 20 and 22 includes same-phase wobbling areas 24A and different-phase wobbling areas 24B that intersect at every predetermined region and appear alternately in the circumference direction i.e., the proceeding direction of the respective track. These same-phase wobbling areas 24A alternate with the difference-phase wobbling areas 24B in the diameter direction i.e., the width direction of the land and groove track 20 and 22. In the same-phase wobbling area 24A represented by the oblique lines in FIG. 3, being preformatted with ID information including an address information, etc. thereon, each side of the respective land and groove signal tracks 20 and 22 is wobbled to have the same-phase in accordance with carrier which ID information is frequency-modulated. Each side of the difference-phase wobbling areas 24B is wobbled to have the difference phase by alternating the difference-phase wobbling areas 24B with the same-phase wobbling areas 24A in both the proceeding direction and the width direction of the signal tracks 20 and 22. As a result, the address information can be obtained from a wobbling signal on only same-phase wobbling area 24A. For example, if a pair of the same-phase area 24A and the difference-phase wobbling area 24B is used for an information recording unit i.e., one frame as shown FIG. 3, the address information is readout from only the same-phase wobbling area 24A positioned in front and back of the difference-phase wobbling area 24B so that an user information is recorded in the information recording unit on the basis of the readout address information. Therefore, in the recording medium having such structure, the information can be recorded on all of the land and groove signal tracks 20 and 22, furthermore all of recordable areas is used.

Figure 6:
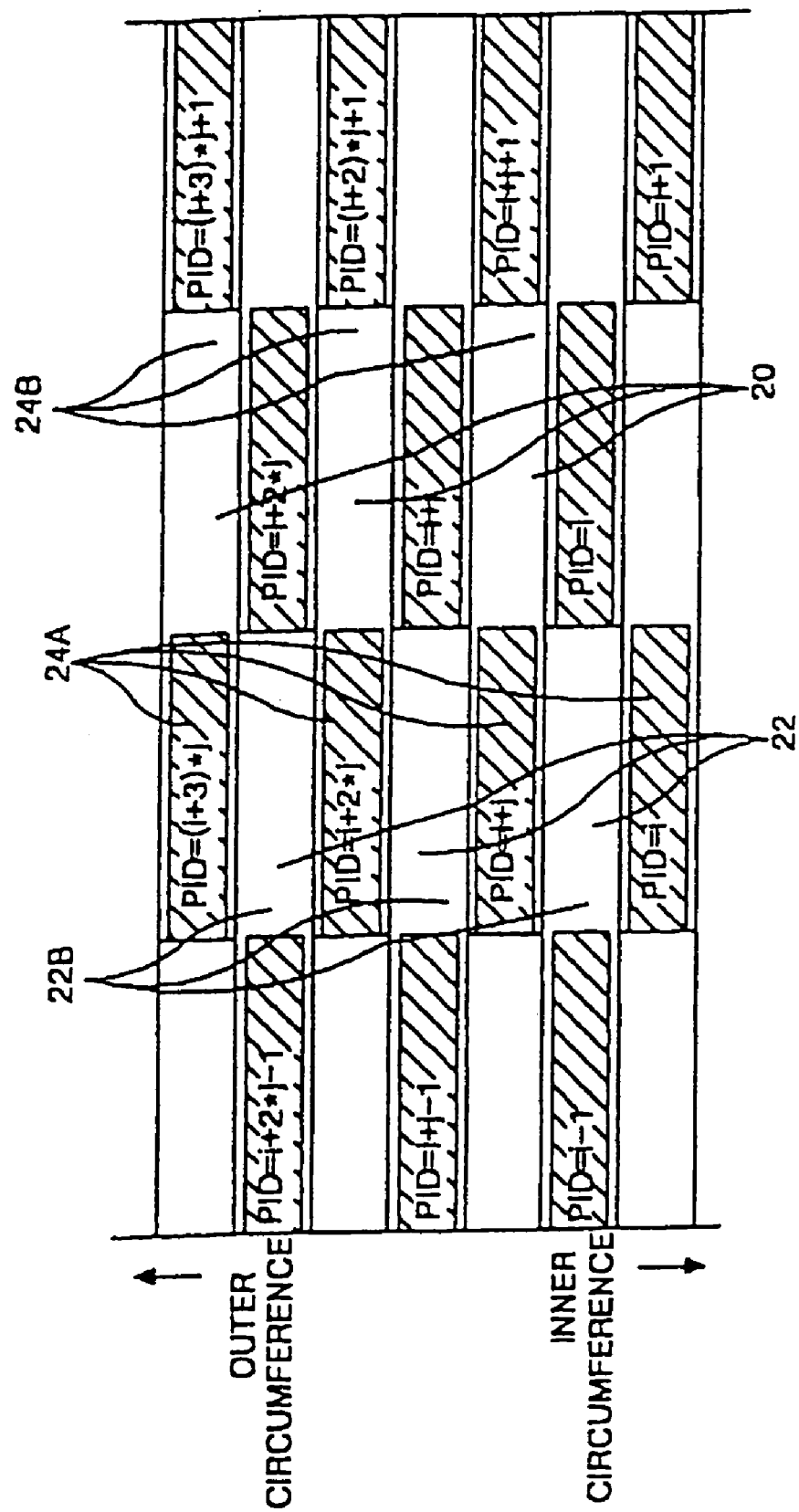
FIG. 6 is a view for explaining a changing state in frame IDs preformatted in signal tracks of the optical disc shown in FIG. 4.
Figure 7:
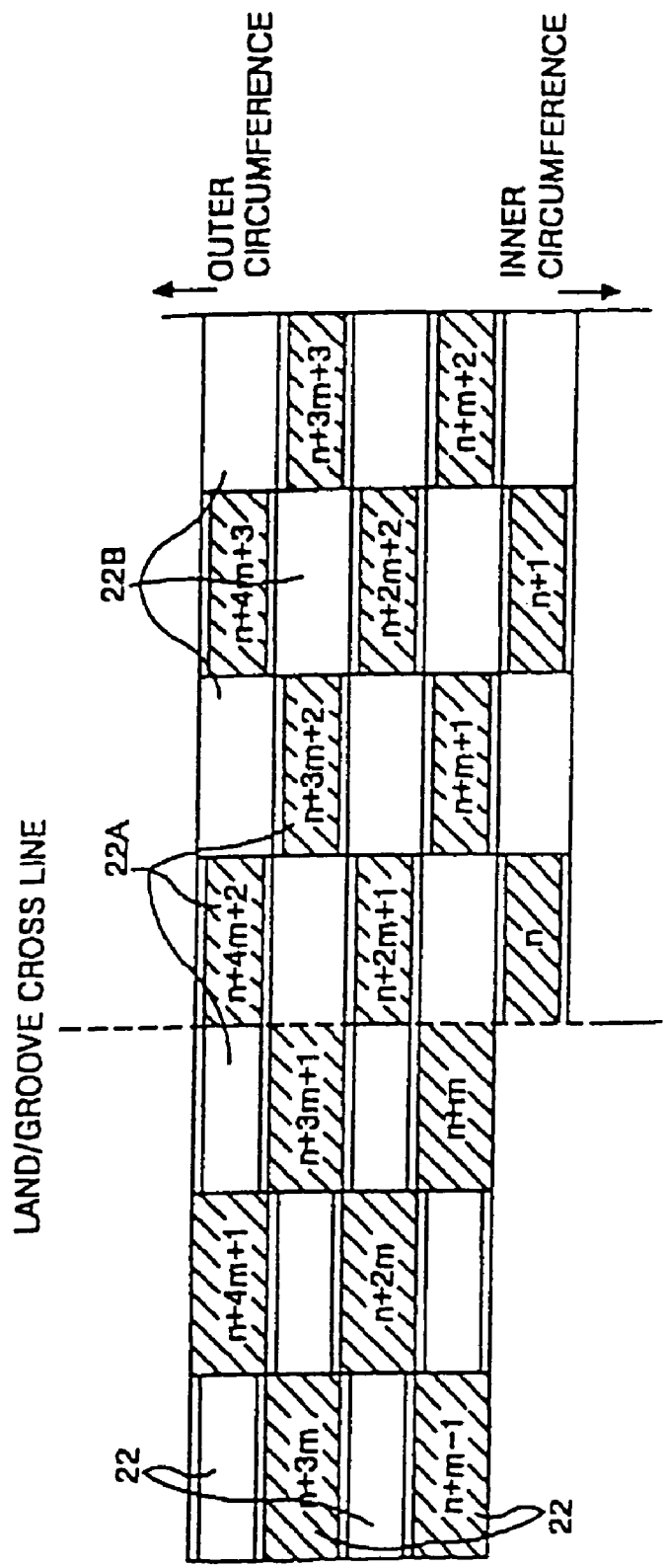
FIG. 7 is a view for explaining a changing state in frame IDs preformatted in signal tracks of the optical disc shown in FIG. 5.

FIG. 4 shows an optical disc, wherein the land and groove tracks 20 and 22 as shown in FIG. 3 are defined in parallel in a spiral shape. In the diameter direction, the same-phase wobbling area 24A is positioned in only the land signal track 20 or the groove signal track 22 and the different-phase wobbling area 24B is positioned in only the groove signal track 22 or the land signal track 20. In other words, the same-phase wobbling area 24A and the different-phase wobbling area 24B appear alternately in both the circumference direction and the diameter direction. j same-phase wobbling areas 24A and j different-phase wobbling areas 24B are alternately arranged in each of the land and groove signal tracks 20 and 22 for one turn to divide the signal track 20 and 22 for one turn into j frames. As shown in FIG. 6, the same-phase wobbling areas 24A formed in the land signal track 20 have sequentially increasing frame identification codes PIDs, respectively. Likewise, the same-phase wobbling areas 24A formed in the groove track 22 also have sequentially increasing frame identification codes PIDs, respectively.

FIG. 5 shows an optical disc, wherein the ID information of the address information, etc. is preformatted on each of the land and groove tracks 20 and 22 which is alternated by one turn to make single spiral shape, as shown in FIG. 4. In FIG. 5, the single signal track is changed from the land signal track 20 to the groove signal track 22 or from the groove signal track 22 to the land signal track 20 on the basis of a land/groove cross line. Also, the same-phase wobbling area 24A and the difference-phase wobbling area 24B are alternatively arranged in each of the land and groove signal tracks 20 and 22. In the diameter, the same-phase wobbling area 24A is positioned in only the land signal track 20 or the groove signal track 22 and the different-phase wobbling area 24B is positioned in only the groove signal track 22 or the land signal track 20. That is, the same-phase wobbling area 24A and the different-phase wobbling area 24B appear alternately in both the circumference direction and the diameter direction. In order to alternate the same-phase wobbling area 24A and the difference-phase wobbling area 24B in the diameter direction, the same-phase wobbling areas 24A and the difference-phase wobbling areas 24B included in each of the signal tracks 20 and 22 for one turn is increased by one in the number as the signal tracks 20 and 22 are proceeded from inner circumference to outer circumference. For example, in the signal tracks 20 and 22 for two turns (i.e., a pair of land and groove signal tracks 20 and 22), 2m+1 same-phase wobbling areas 24A and 2m+1 difference-phase wobbling areas exist. That is, 2m+1 frames exist. Therefore, in the signal track 20 or 22 for one turn, any one area of both areas is m+1 and the other area is m. Furthermore, if the signal tracks 20 and 22 for two turns (i.e., a pair of land and groove signal tracks 20 and 22) are divided into 7 frames, m is 3 and so the same-phase wobbling area 24A and the difference-phase wobbling area 24B exist by 7, respectively. In detail, 4(=m+1) same-phase wobbling areas 24A and 3(=m) difference-phase wobbling areas 24B are arranged in the signal track for first one turn (i.e., in the land signal track 20) and 3(=m) same-phase wobbling areas 24A and 4(=m+1) difference-phase wobbling areas 24B are positioned in the signal track for second one turn (i.e., in the groove signal track 22).

Figure 8:
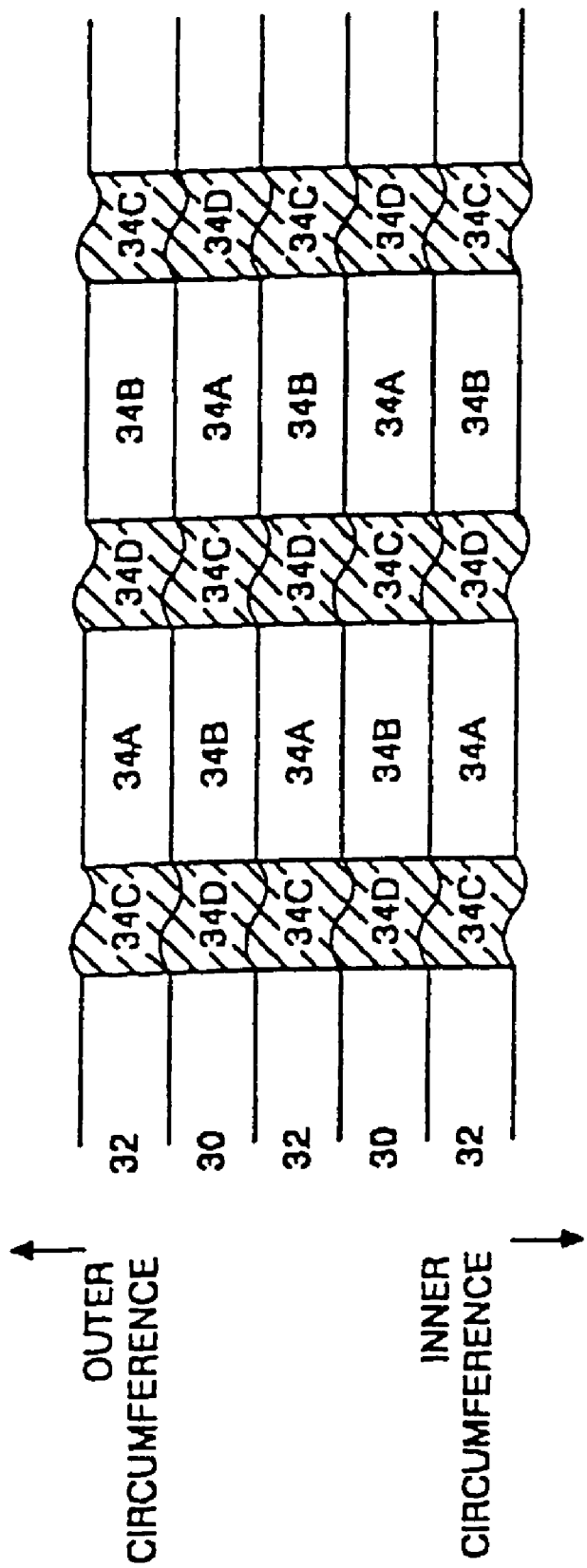
FIG. 8 is a schematic view showing a signal track structure of an optical disc according to another embodiment of the present invention.

Referring now to FIG. 8, there is shown an optical disc according to another embodiment of the present invention having land and groove signal tracks 30 and 32. The optical disc of FIG. 8 includes the same-phase wobbling area 34A and difference-phase wobbling area 34B such as in FIG. 3 and further comprises a pre-wobbling area 34C and post-wobbling area 34D which a synchronous pattern is preformatted in each front of the same-phase wobbling area 34A and the difference wobbling area 34B. The pre-wobbling area 34C and post-wobbling area 34D are formed on both the land and groove signal tracks 30 and 32 in same format. That is, the pre-wobbling area 34C and the post-wobbling area 34D have the same phase without regarding to the land and groove signal tracks 30 and 32. Also, in each of the pre-wobbling area 34C and post-wobbling area 34D, the different synchronous patterns each other, i.e. logical values having a complementary relationship are respectively preformatted. Since the land and groove tracks 30 and 32 have optical characteristics contrary to each other and the pre-wobbling area 34C and post-wobbling area 34D are alternatively arranged in the width direction of the signal tracks 30 and 32, signals having phases contrary to each other are detected from each of the pre-wobbling area 34C and the post-wobbling area 34D having the same phase. In detail, the synchronous patterns preformatted on the pre-wobbling areas 34C represented by oblique lines in FIG. 8 have the same logical value, likewise the synchronous patterns preformatted on post-wobbling areas 34D represented not by oblique lines also have the same logical value. Contrarily, the synchronous patterns on the pre-wobbling area 34C represented by the oblique lines and on the post-wobbling area 34D represented not by the oblique lines have logical values in the complementary relationship, respectively. The synchronous patterns preformatted on the pre-wobbling area 34C and on the post-wobbling area 34D indicate reference points for each of the same-phase wobbling area and the difference-phase wobbling area 34D.

Figure 9:
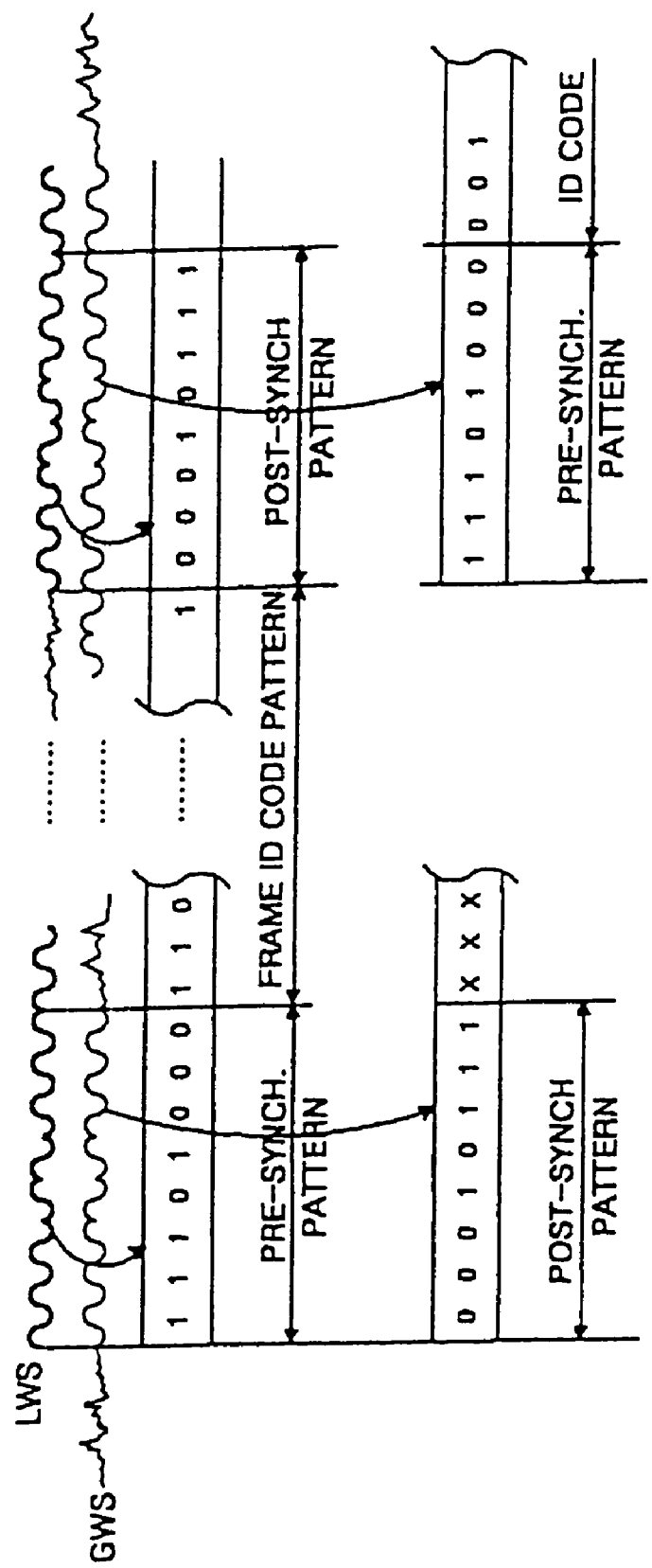
FIG. 9 illustrates wobbling signals detected from the optical disc having the signal track structure in FIG. 9 and synchronous patterns and identification codes decoded with the wobbling signals.

FIG. 9 illustrates the synchronous patterns detected from the pre-wobbling area 34C and the post-wobbling area 34D as shown in FIG. 8. A pre-synchronous pattern is detected from the pre-wobbling area 34C and a post-synchronous pattern is obtained from the post-wobbling area 34D. A LWS is a wobbling signal detected from the land signal track 30 and a GWS is a wobbling signal detected from the groove signal track 32. These wobbling signals LWS and GWS include a pre-synchronous component detected from the pre-wobbling area 34C and a post-synchronous component detected from the post-wobbling area 34D, wherein the pre-synchronous component and the post-synchronous component have the phases contrary to each other, respectively. The pre-synchronous pattern of "00010111" and the post-synchronous pattern of "11101000" are obtained by demodulating the pre-synchronous component and post-synchronous component. In other words, the pre-synchronous pattern and the post-synchronous pattern are readout from each of the land and groove signal tracks 30 and 32 adjacent to each other. These synchronous patterns is preformatted on the signal tracks 30 and 32 so that it is effectively performed the access of the optical disc.

Figure 1:
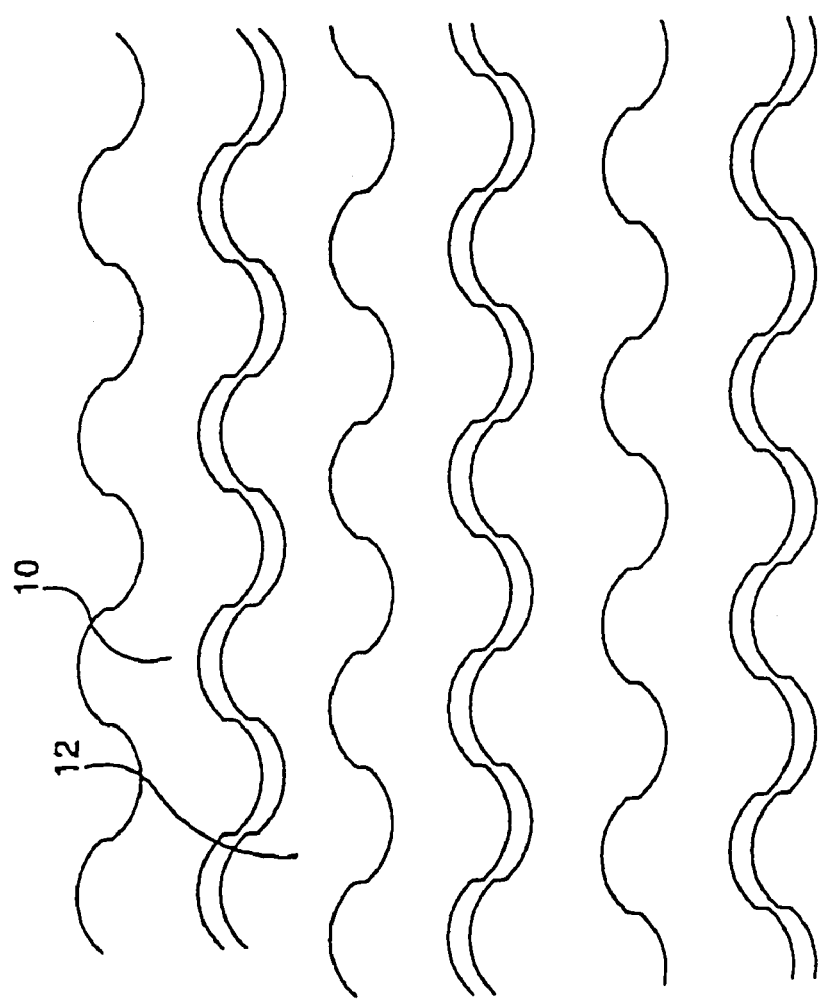
FIG. 1 is a schematic view showing a signal track structure of a CD-R disc.
Figure 2:
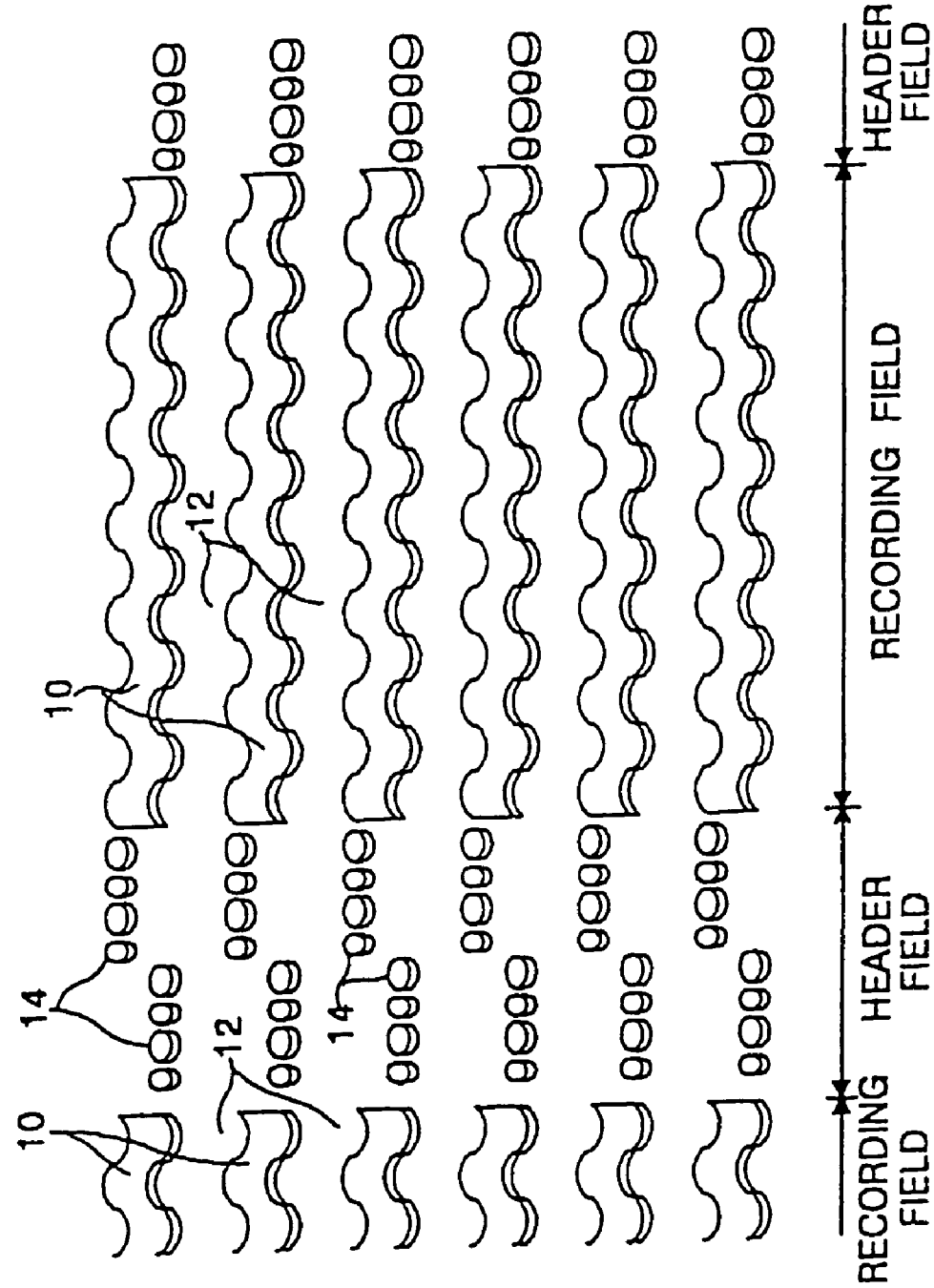
FIG. 2 is a schematic view showing a signal track structure of a DVD-RAM disc.
Figure 10:
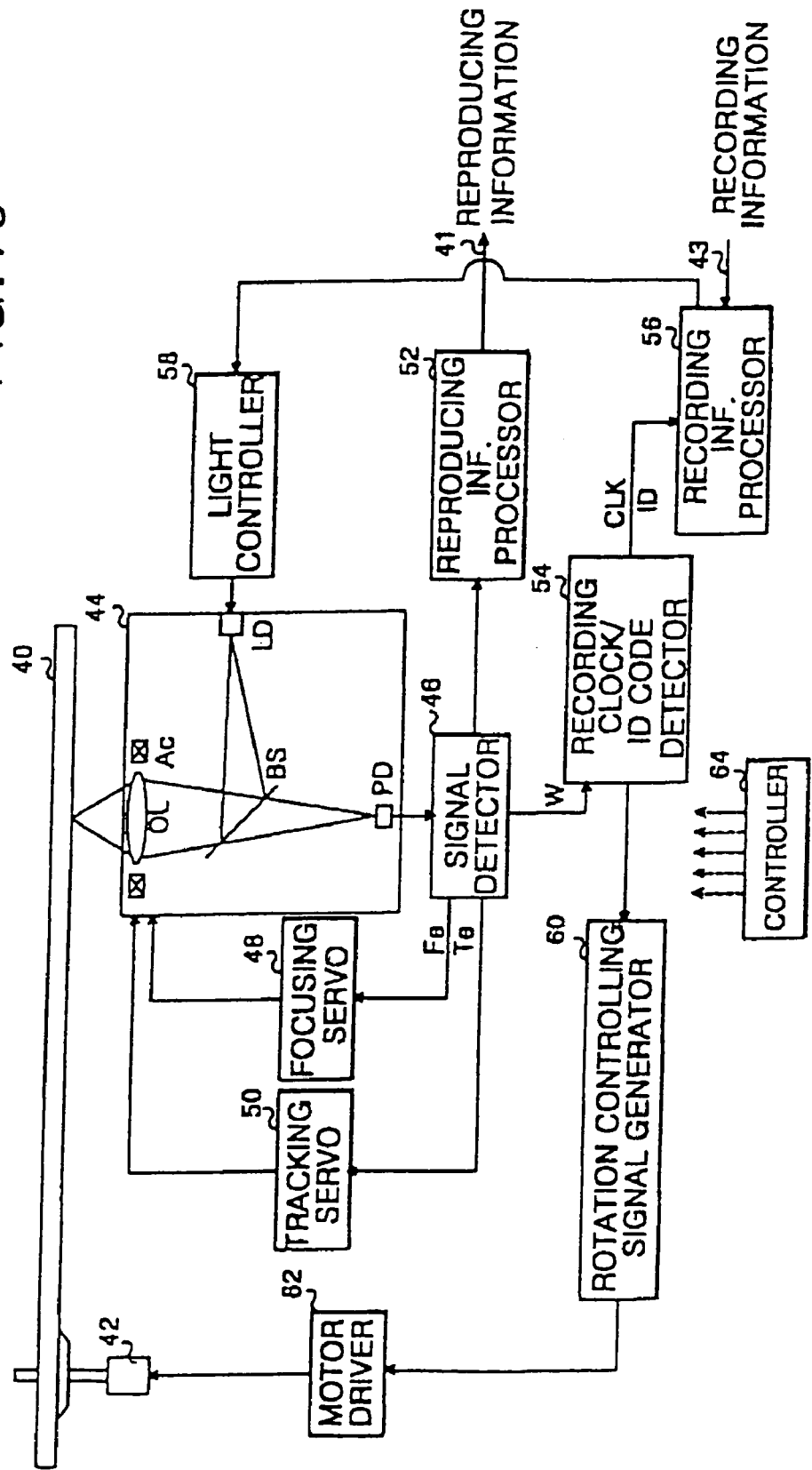
FIG. 10 is a schematic view showing a conventional information recording/reproducing apparatus for accessing an optical disc having the signal track structure in FIG. 1 or FIG. 2.
Figure 11:
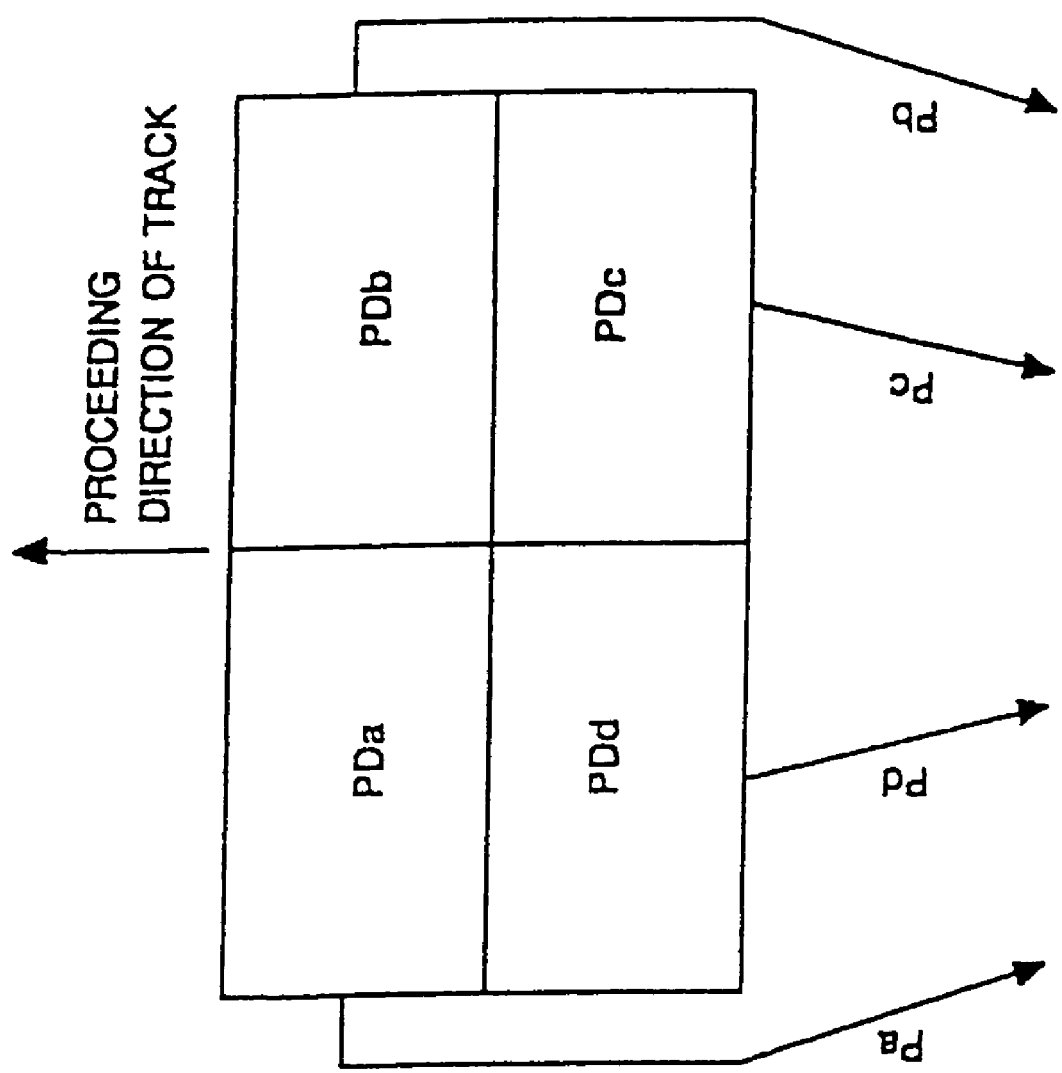
FIG. 11 is a detailed view of the photo detector shown in FIG. 10.

Referring now to FIG. 10, there is shown a conventional information recording/reproducing apparatus for accessing the optical disc in FIG. 1 and FIG. 2. A process of accessing the optical discs according to embodiments of the present invention using this information recording/reproducing apparatus will be explained below. In FIG. 10, the information recording/reproducing apparatus includes a spindle motor 42 for rotating an optical disc 40, an optical pickup 44 for accessing the optical disc 40 and a signal detector 46 connected, in series, to the optical pickup 44. The optical pickup 44 irradiates a light beam onto land or groove signal tracks of the optical disc 40, that is, onto the land or groove signal tracks 20 or 22 as shown in FIG. 3, or the land or groove signal tracks 30 or 32 as shown in FIG. 8, thereby writing an information into the land or groove signal tracks, or reading out the information written into the land or groove signal tracks. To this end, the optical pickup 44 includes a beam splitter BS for guiding a light beam from a laser diode LD to an objective lens OL and a light beam from the objective lens LD to a photo detector PD, and an actuator AC for moving the objective lens to the up, down, left, and right to perform a focusing and a tracking. The objective lens OL converges a light beam directing the beam splitter BS to the optical disc 40. The beam splitter BS allows a light beam from the laser diode LD to be irradiated, via the objective lens OL, onto the land signal track or the groove signal track of the optical disc 40, and allows a light beam reflected by the optical disc 40 to be progressed to the photo detector PD. The actuator AC moves the objective lens OL in the up and down direction, thereby irradiating a light beam onto the surface of the land or groove signal track in a spot shape. Also, the actuator AC moves the objective lens OL in the left and right direction, thereby tracing a light beam along the center line of the land or groove track. The photo detector PD converts a quantity of the reflective light received, via the objective lens OL and the beam splitter BS, from the optical disc 40 into an electrical signal. As shown in FIG. 11, the photo detector PD consists of four photo detecting pieces PDa to PDd so that it can detect a distribution of the light irradiated onto the signal tracks 20 and 22. The four light detecting pieces PDa to PDd are positioned such that they correspond to each other for two pieces on a basis of the progressing direction of the signal track. In other words, the first and fourth light detecting pieces PDa and PDd are positioned at the outer circumference or the inner circumference on the basis of the progress direction of the signal track; while the second and third light detecting pieces PDb and PDc are positioned at the inner circumference or the outer circumference, respectively. The signal detector 46 detects a wobbling signal W, a focusing error signal Fe, a tracking error signal Te and a radio frequency signal RF included in first to fourth electrical signals Pa to Pd. The wobbling signal W, the focusing signal Fe, the tracking error signal Te and the radio frequency signal RF are obtained by calculating the first to fourth electrical signals Pa to Pd by the following equations:

$$W = (Pa+Pd) - (Pb+Pc) \quad (1)$$

$$Fe = (Pa+Pc) - (Pb+Pd) \quad (2)$$

$$Te = \int [(Pa+Pd) - (Pb+Pc)] dt \quad (3)$$

$$RF = Pa + Pb + Pc + Pd \quad (4)$$

When an optical disc shown in FIG. 3 is recorded or reproduced, the wobbling signal W includes a same-phase wobbling component detected from a region in which each side of the land or groove track 20 or 22 is wobbled in the same phase, and a different-phase wobbling component detected from a region in which each side of the land or groove track 20 or 22 is wobbled in a different phase. Otherwise, when an optical disc shown in FIG. 8 is recorded or reproduced, the wobbling signal W includes a same-phase wobbling component detected from a region in which each side of the land or groove track 30 or 32 is wobbled in the same phase, a different-phase wobbling component detected from a region in which each side of the land or groove track 30 or 32 is wobbled in the different phase, and a pre-wobbling and post-wobbling components detected from each of the pre-wobbling area 34C and post-wobbling area 34D in which each side of the land and groove signal tracks 30 and 32 is wobbled in the same phase.

A focusing servo 68 included in the information recording/reproducing apparatus responds to the focusing error signal Fe from the signal detector 66 to control a voltage or a current supplied to the actuator Ac, thereby moving the objective lens OL in the vertical direction by means of the actuator Ac. By moving the objective lens OL in the vertical direction, a spot-shaped light beam is irradiated onto the land or groove track of the optical disc 60. Likewise, a tracking servo 70 responds to the tracking error signal Te to control a voltage or a current supplied to the actuator Ac, thereby moving the objective lens OL in the horizontal direction by means of the actuator Ac. By moving the objective lens OL in the horizontal direction, a light beam irradiated onto the optical disc 40 traces the land or groove track.

The information recording/reproducing apparatus includes a reproducing information processor 52 receiving the radio frequency signal RF from the signal detector 46, and a recording clock/identification code detector 54 receiving the wobbling signal W from the signal detector 46. The reproducing information processor 52 detects a channel bit stream from the radio frequency signal RF and decodes the channel bit stream, thereby reproducing an information recorded on the land or groove signal track 20 or 22 shown in FIG. 3, or recorded on the land or groove signal track 30 or 32 shown in FIG. 8. The information generated in the reproducing information processor 42 is output to an output line 41. Meanwhile, the recording clock/identification code detector 44 detects a recording clock SCLK, an identification code ID including an address, etc. indicating the physical position of the frame, and a rotation speed information indicating a rotation speed of the optical disc 40. When the optical disc 40, in which the same-phase and different-phase wobbling area 24A and 24B are formed as shown in FIG. 3, is recorded or reproduced, or when the optical disc 40, in which the same-phase and different-phase wobbling area 34A and 34B and pre-wobbling and post-wobbling signals 34C and 34D are formed as shown in FIG. 8, is recorded or reproduced, the recording clock/identification code detector 74 detects the recording clock SCLK, the identification code ID and the rotation speed information from the same-phase component included in the wobbling signal W and the pre-synchronous and post-synchronous patterns from each of the pre-wobbling and post-synchronous components. Otherwise, when a different-phase wobbling component is input, the recording clock/identification code detector 54 indicates the generation of error. Meanwhile, the recording information processor 56 makes a blocking of a recording information input from the input line 43 into a frame size and adds the identification code ID to each blocked information, thereby producing a channel bit stream. Further, the recording information processor 56 transfers the channel bit stream to a light controller 58 in conformity to the recording clock SCLK from the recording clock/identification code detector 54. Then, the light controller 58 intermits a light beam generated at the laser diode LD in accordance with a logical value of the channel bit stream from the recording information processor 76, thereby recording the channel bit stream on the signal track of the optical disc 40, i.e., the land or groove signal track 20 or 22 in FIG. 3, or the land or groove signal track 30 or 32 in FIG. 8.

The information recording/reproducing apparatus includes a rotation control signal generator 60 and a motor driver 62 that are connected, in series, between the recording clock/identification code detector 54 and the spindle motor 42, and a controller 64 for controlling a recording/reproducing operation. The rotation control signal generator 60 detects a rotation speed error amount from the rotation speed information from the recording clock/identification code detector 54 and controls a voltage level or a current amount of the rotation control signal applied to the motor driver 62 in accordance with the detected rotation speed error amount. Then, the motor driver 62 accelerates or decelerates the rotation speed of the spindle motor 42 in accordance with a voltage level or a current amount of the rotation speed signal from the rotation speed signal generator 60. By accelerating or decelerating the rotation speed of the spindle motor 42, a play speed in the signal track of the optical disc 40 is maintained constantly. The controller 64 controls the operation state of the focusing servo 48 and the tracking servo 50. Also, the controller 64 operates the recording information processor 56 and the reproducing information processor 52 selectively in a recording/reproducing mode and control the light controller 58 in accordance with the recording/reproducing mode, thereby controlling an intensity of a light beam generated at the laser diode LD.

Figure 12:
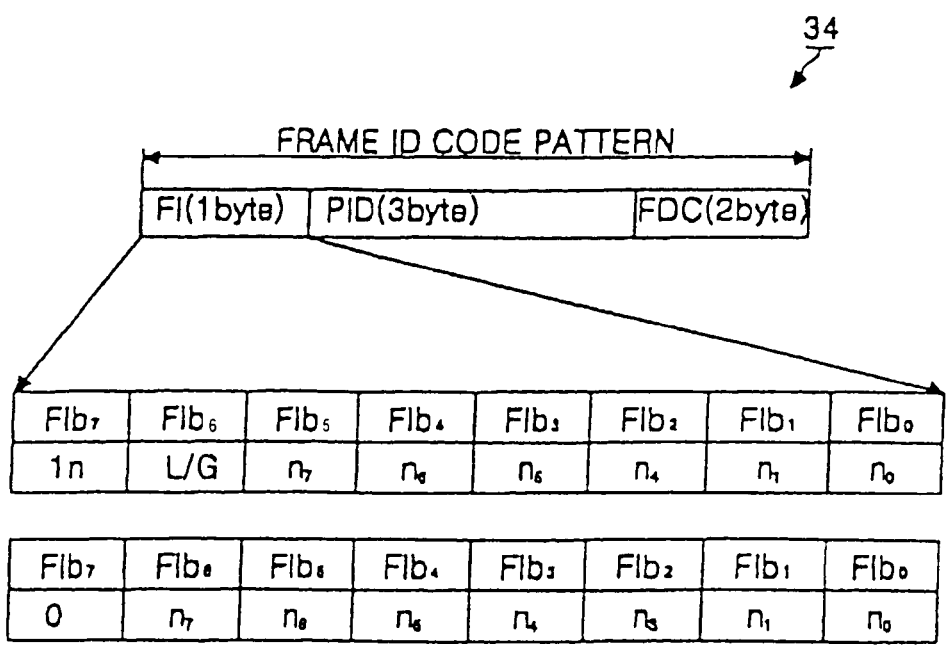
FIG. 12 is a detail view of the frame identification code pattern on the same-phase wobbling area 34A as shown in FIG. 8.

FIG. 12 explains a frame identification code pattern on the same-phase wobbling area 34A as shown in FIG. 8. The frame identification code pattern is positioned between the pre-synchronous pattern and post-synchronous pattern and indicates a frame area recording a user information of frame. The frame identification code pattern includes a frame information FI of 1 byte, a physical address PID of 3 bytes and an error detecting code EDC of 2 bytes. The frame information indicates whether the frame identification code pattern is pre-formatted at any one of the land and groove signal tracks 30 and 32. A most significant bit FIb7 included in the frame information FI represents whether the frame information FI is valid or not. A secondly higher significant bit FIb6 next the most significant bit FIb7 indicates whether the frame identification code pattern is pre-formatted on any one of the land and groove signal tracks 30 and 32. The rest 6 bits FIb5 to FIb0 have an information for a transition between the land and groove signal tracks 30 and 32, for example the number of frame identification code patterns from the corresponding frame identification code pattern to a transition between the land and groove signal tracks. If the most significant bit FIb7 is "1" and the secondly higher significant bit FIb6 is "1" (or "0"), the frame identification code pattern (i.e., the frame information FI) indicates the track identifying information, the number of other frame identification code patterns from the corresponding frame identification code pattern to the transition position between the land and groove signal tracks 30 and 32, and a fact of that the corresponding frame identification code pattern is recorded on the land signal track 30 or on the groove signal track 32.

Also, the frame information FI can be used to record another information. For example, the frame information includes other information when the its most significant bit FIb7 is "0". Such a frame information can be included in each frame identification code pattern or recorded every a predetermined frame identification code patterns.

An optical disc reproducing apparatus detects the frame information FI of the frame identification code pattern on the disc and reads out a logical value of the frame information FI, thereby determining whether any one of the land and groove signal tracks 20 and 22 is accessed now. Also, the optical disc reproducing apparatus finds out the transition position between the land and groove signal tracks 20 and 22.

In the frame identification code pattern, the physical address PID between the frame information FI and the error detecting code EDC indicates a position on the disc in which a user data is recorded. The error detecting code EDC represents whether errors are in the frame information FI and the physical address PID or not. Also, the error detecting code EDC is used to correct the errors in the frame information FI and the physical address PID. To this end, the error detecting code EDC can be recorded on the disc in a CRC (Cyclic Redundancy Check) code.

Figure 13:
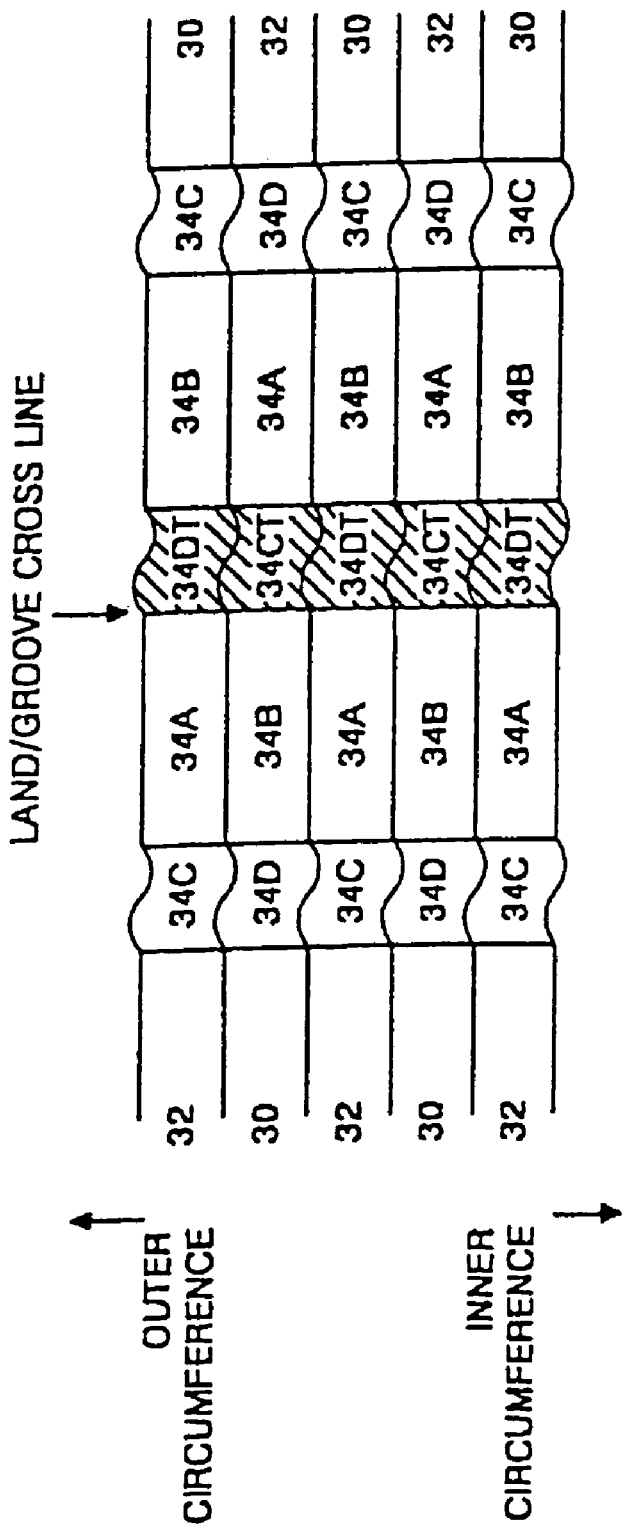
FIG. 13 is a schematic view showing a signal track structure of an optical disc according to still another embodiment of the present invention.

FIG. 13 illustrates a disc of land/groove recording system according to an embodiment of the present invention, which has a synchronous pattern or signal allowing the transition position on the disc to be detected.

Figure 14A:
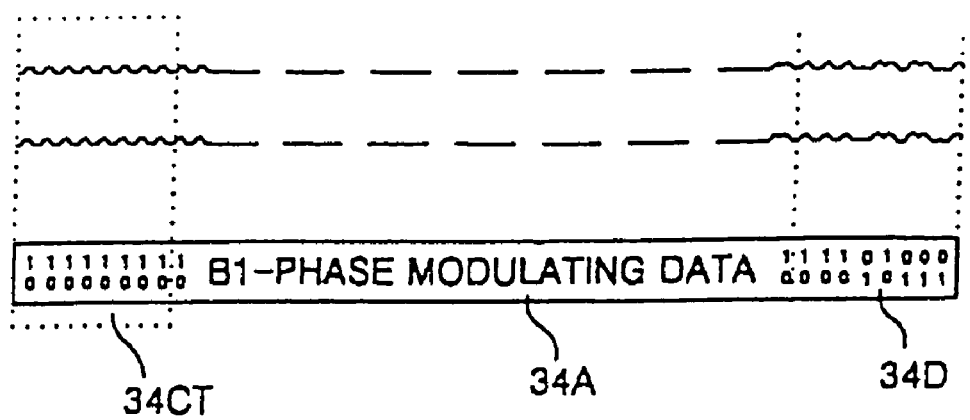
FIGS. 14A and 14B are detail view of the land/groove transition information as shown in FIG. 13.
Figure 14B:
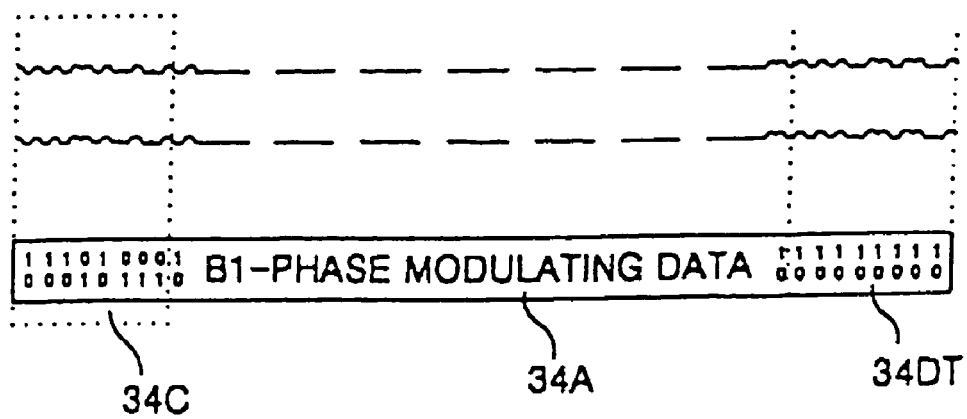

Referring to FIG. 13, the disc according to an embodiment of the present invention includes same-phase wobbling areas 34A and different-phase wobbling areas 34B arranged alternatively between synchronous patterns (or signals) 34C and 34D, on each land and groove signal track 30 and 32. Also, the disc comprises another synchronous patterns 34CT and 34DT for indicating the transition position between the land and groove signal tracks 30 and 32. On the basis of a physical address preformatted on the same-phase wobbling area 34A in a shape which both side of the signal track 30 or 32 is wobbled, a user data is recorded on the same-phase wobbling area 34A and the different-phase wobbling area 34B. The synchronous pattern 34C and 34D is preformatted between the same-phase wobbling area 34A and the different-phase wobbling area 34B and defines the same-phase wobbling area 34A and the different-phase wobbling area 34B. The another synchronous pattern (or signal) 34CT and 34DT is preformatted at a position adjacent to a land/groove cross line and has a data being against a bi-phase modulating regulation, thereby indicating the transition position between the same-phase wobbling area 34A and the different-phase wobbling area 34B. In other words, the present invention allows a pre-synchronous pattern 34CT and post-synchronous pattern 34DT of the same-phase wobbling area 34A at each starting portion of the land or groove signal track 30 or 32 to have the data being against the bi-phase modulating regulation, thereby indicating the transition position between the same-phase and different-phase wobbling areas 34A and 34B. For example, the pre-synchronous pattern 34CT or post-synchronous pattern 34DT of the same-phase wobbling area 34A at each starting portion of the land or groove signal track 30 or 32 are preformatted to have the data (or code) such as "11111111" or "00000000" which bits having a identified value are continued to be against the bi-phase modulating regulation, as shown in FIGS. 14A and 14B.

Figure 15:
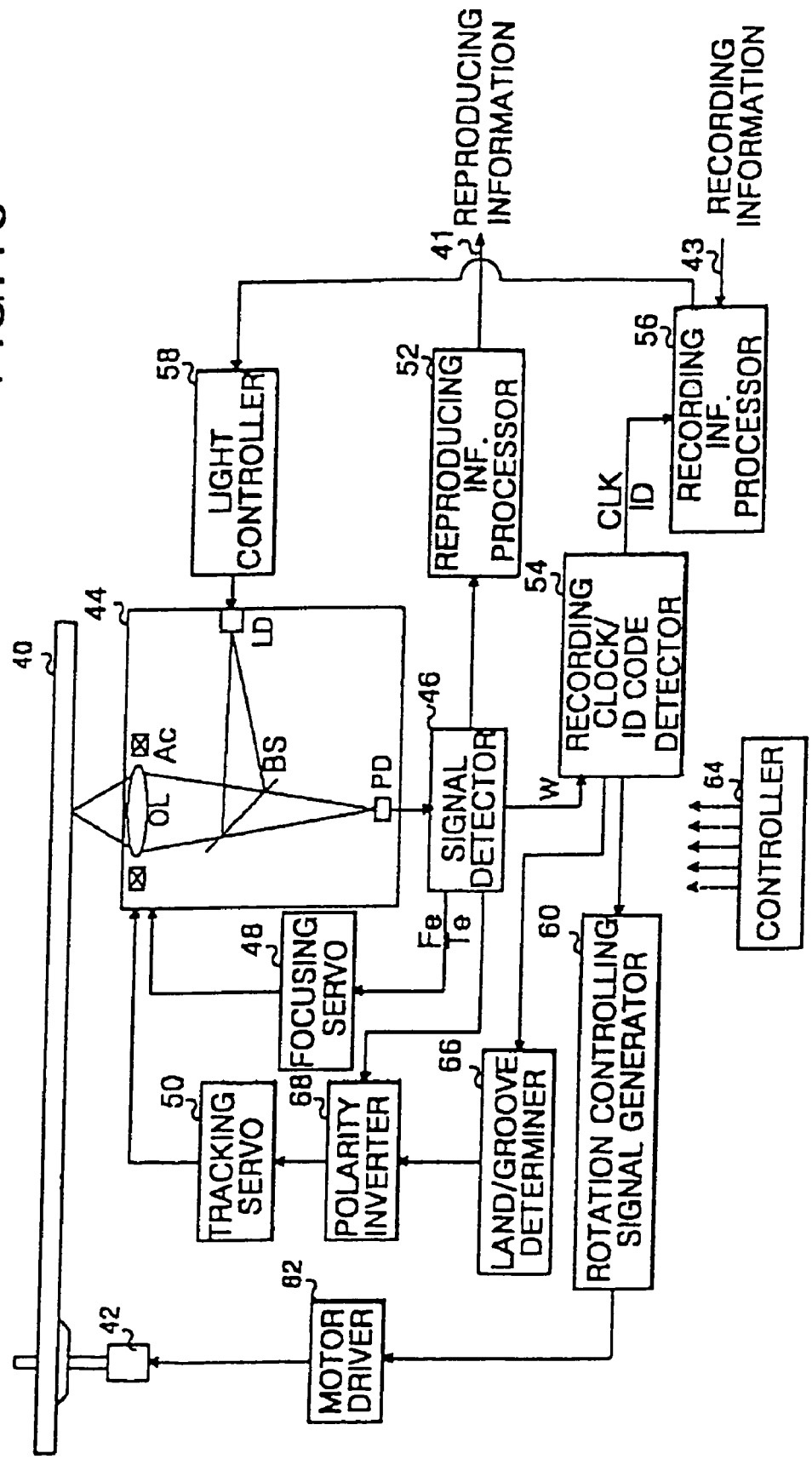
FIG. 15 is a schematic view showing an optical disc recording/reproducing apparatus for accessing an optical disc having the signal track structure in FIG. 12 or FIG. 13, according to an embodiment of the present invention.

FIG. 15 shows an optical recording/reproducing apparatus according to an embodiment of the present invention. The optical recording/reproducing apparatus accesses the optical disc shown in FIGS. 12, 13, 14A and 14B.

The optical recording/reproducing apparatus of FIG. 15 has a configuration similar to the information recording/reproducing apparatus shown in FIG. 11. The difference between the optical recording/reproducing apparatus of FIG. 15 and the information recording/reproducing apparatus of FIG. 10 is that the optical recording/reproducing apparatus further includes a land/groove determiner 66 receiving a land/groove track transition information from the recording clock/identification code detector 54 and a polarity inverter 68 connected among the signal detector 46, the tracking servo 50 and the land/groove determiner 66.

The optical pickup 44 irradiates a light beam onto land or groove signal tracks of the optical disc 40, that is, onto the land or groove signal tracks 30 or 32 as shown in FIG. 13, thereby writing an information into the land or groove signal tracks. Also, the optical pickup 44 converts the lights reflected by the disc 40 into an electrical signal and reads out the information written into the land or groove signal tracks. The signal detector 46 detects a wobbling signal W, a focusing error signal Fe, a tracking error signal Te, and a radio frequency signal RF included in four electrical signals from four detecting pieces of the optical pickup 44. The recording clock/identification code detector 54 receives the wobbling signal W and detects the land/groove transition information, a recording clock SCLK, an identification code ID including an address, etc. indicating the physical position of the frame, and a rotation speed information indicating a rotation speed of the optical disc 40. If the disc 40 has the frame information FI of 1 byte preformatted between the synchronous pattern (or signal) 34C and the physical address PID as shown FIG. 12, the recording clock/identification detector 54 detects the frame information FI from the wobbling signal W and generates the land/groove track transition information on the basis of the frame information FI. On the other hand, when the optical disc 40 includes the land/groove track transition information preformatted at the pre-synchronous pattern 34CT or post-synchronous pattern 34DT of the same-phase wobbling area 34A in the starting and end portions of the land or groove signal track 30 or 32, the recording clock/identification detector 54 detects the corresponding synchronous pattern (or signal) from the wobbling signal W so as to generates the land/groove track transition information.

The reproducing information processor 52 detects a channel bit stream from the radio frequency signal RF and decodes the channel bit stream, thereby reproducing an information recorded on the land or groove signal track 20 or 22 shown in FIG. 3, or recorded on the land or groove signal track 30 or 32 shown in FIG. 8. The recording information processor 56 makes a blocking of a recording information (or a user data) input from the input line 43 into a frame size and adds the identification code ID, which is received from the recording clock/identification detector 54 to each blocked information, thereby producing a channel bit stream. Further, the recording information processor 56 transfers the channel bit stream to a light controller 58 in conformity to the recording clock SCLK from the recording clock/identification code detector 54. Then, the light controller 58 intermits a light beam generated at the laser diode LD in accordance with a logical value of the channel bit stream from the recording information processor 56, thereby recording the channel bit stream on the signal track of the optical disc 40, i.e., the land or groove signal track 20 or 22 in FIG. 3, or the land or groove signal track 30 or 32 in FIG. 8.

The land/groove determiner 66 controls the polarity inverter 58 in accordance with the land/groove track transition information from the recording clock/identification detector 54. The polarity inverter 68 inverts a polarity of the tracking error signal to be transferred from the signal detector 46 to the tracking servo 50 upon a control of the land/groove determiner 66, at each time which the land/groove track transition information L/G is generated, i.e., every a predetermined track period which the signal track changes from the land signal track or the groove signal track to the groove signal track or the land signal track.

The tracking servo 50 responds to the tracking error signal Te from the polarity inverter 68 to control a voltage or a current supplied to the actuator Ac, thereby moving the objective lens OL in the horizontal direction by means of the actuator Ac. By moving the objective lens OL in the horizontal direction, a light beam irradiated onto the optical disc 40 traces the land or groove track. Likewise, the focusing servo 48 responds to the focusing error signal Fe from the signal detector 46 to control a voltage or a current supplied to the actuator Ac, thereby moving the objective lens OL in the vertical direction by means of the actuator Ac. By moving the objective lens OL in the vertical direction, a spot-shaped light beam is irradiated onto the land or groove track of the optical disc 40.

The rotation control signal generator 60 detects a rotation speed error amount from the rotation speed information from the recording clock/identification code detector 54 and controls a voltage level or a current amount of the rotation control signal applied to the motor driver 62 in accordance with the detected rotation speed error amount. Then, the motor driver 62 accelerates or decelerates the rotation speed of the spindle motor 42 in accordance with a voltage level or a current amount of the rotation speed signal from the rotation speed signal generator 60. By accelerating or decelerating the rotation speed of the spindle motor 42, a play speed in the signal track of the optical disc 40 is maintained constantly. The controller 64 controls the operation state of the focusing servo 48 and the tracking servo 50. Also, the controller 64 operates the recording information processor 56 and the reproducing information processor 52 selectively in a recording/reproducing mode and control the light controller 58 in accordance with the recording/reproducing mode, thereby controlling an intensity of a light beam generated at the laser diode LD.

Figure 16:
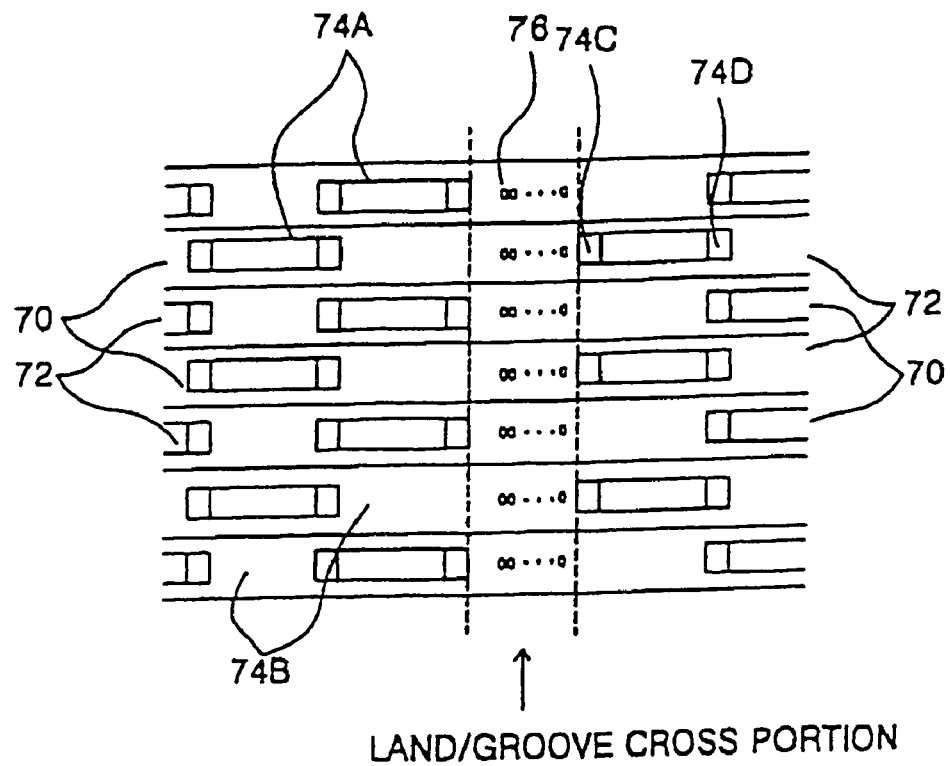
FIG. 16 is a schematic view showing a signal track structure of an optical disc according to still another embodiment of the present invention.

FIG. 16 illustrates an optical disc according to still another embodiment of the present invention.

Referring to FIG. 16, the optical disc includes same-phase areas 74A and different-phase areas 74B arranged alternately on each of land and groove signal tracks 70 and 72, and a land/groove cross portion 76 that the track changes from the land signal track 70 to the groove signal track 72 or from the groove signal track 72 to the land signal track 70. On the land/groove cross portion 76, there is recorded a land/groove transition information for indicating a transition position between the land and groove signal tracks 70 and 72. The land/groove transition information enables the land/groove cross portion 76 to be detected. Therefore, an inversion of a tracking error signal, a control condition and so on can be varied.

Figure 17A:
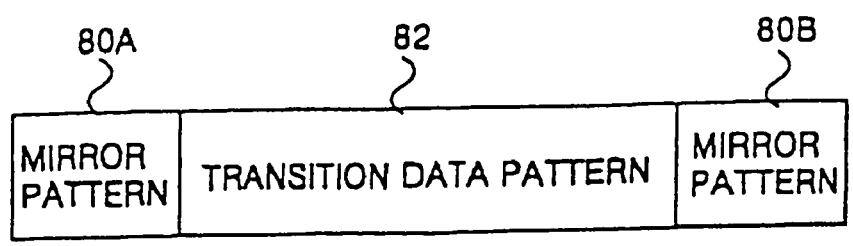
FIG. 17A is a detail view of the land/groove transition information preformatted on the land/groove cross portion as shown in FIG. 16.

FIG. 17A explains the land/groove transition information recorded on the land/groove cross portion 76 of the optical disc.

Figure 17B:
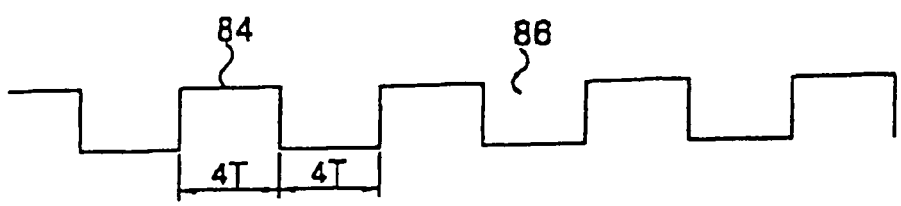
FIG. 17B is a detail view of the transition data pattern included in the land/groove transition information as shown in FIG. 17A.

In FIG. 17A, the land/groove transition information includes first and second mirror patterns (or regions) 80A and 80B arranged in a proceeding direction of each signal track 70 and 72, and a transition data pattern (region) 82 between the first and second mirror patterns 80A and 80B. Each mirror patterns 80A and 80B positioned at both end of the transition data pattern 82 is formed in a predetermined size (for example, 4 bytes). The transition data pattern 82 includes spacers 84 and recording marks 86 arranged alternately by the predetermined number (for example, by each 75), as shown in FIG. 17B. The spacer 84 has the size of 4T and the recording mark 86 is formed in the size of 4T. The number of the spacers 84 and the recording marks 86 can be adjusted by a manufacturer. Therefore, the optical disc recording/reproducing apparatus can detects the land/groove cross portion 76 on the basis of the mirror patterns 80A and 80B and the transition data pattern 82.

Figure 18:
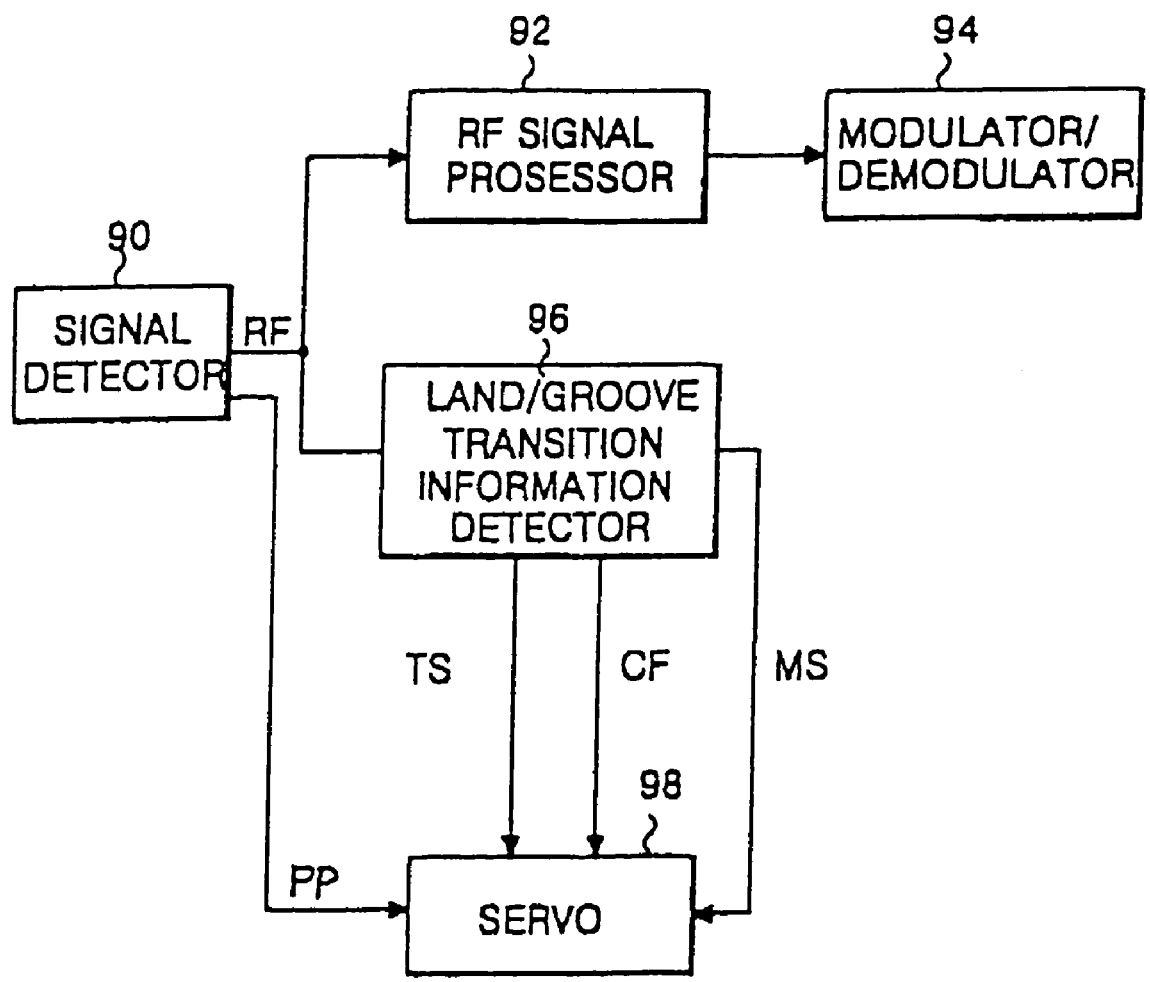
FIG. 18 is a schematic view showing an optical disc recording/reproducing apparatus for accessing an optical disc having the signal track structure in FIG. 16, according to an embodiment of the present invention.

FIG. 18 shows an optical disc recording/reproducing apparatus according to another embodiment of the present invention.

In FIG. 18, the optical disc recording/reproducing apparatus includes a signal detector 90 for detecting a radio frequency signal RF and a push-pull signal PP from an optical disc, a radio frequency signal processor 92 for compensating the radio frequency signal RF from the signal detector 90, a modulator/demodulator 94 for modulating and demodulating the radio frequency signal RF from the radio frequency signal processor 92, a land/groove transition information detector 96 for detecting the land/groove cross portion 76 on the optical disc, and a servo 98 for extracting various signals from the push-pull signal PP and for driving an actuator. The signal detector 90 detects the radio frequency signal RF and the push-pull signal PP from the optical disc. The push-pull signal PP detected by the signal detector 90 is applied to the servo 98. The servo 98 detects a tracking error signal included in the push-pull signal PP and drives the actuator on the basis of the detected tracking error signal, thereby allowing a light beam converged on the optical disc to tracing the center line of the land or groove signal track 70 or 72.

Meanwhile, the radio frequency signal RF detected in the signal detector 90 is supplied to the radio frequency signal processor 92 and the land/groove transition information detector 96. The radio frequency signal processor 92 compensates the radio frequency signal RF from the signal detector 92 so that the radio frequency signal RF can be recorded and reproduced. The compensated radio frequency signal from the radio frequency signal processor 92 is applied to the modulator/demodulator 94. The modulator/demodulator 94 modulates or demodulates the compensated radio frequency signal from the radio frequency signal processor 92. The radio frequency signal RF modulated in the modulator/demodulator 94 is recorded on the optical disc through a recording unit (not shown). The radio frequency signal RF demodulated in the modulator/demodulator 94 is reproduced by means of a reproducing unit (not shown).

Also, the land/groove transition information detector 96 detects the land/groove transition information, thereby determining whether the light beam arrives at the land/groove cross portion 76. The land/groove transition information detector 96 applies a switching signal TS, a confirmative signal CF and a masking signal MS to the servo 98 when the land/groove transition information is detected. The servo 98 inverts a polarity of the tracking error signal and changes a control status of the servo motor, at each time which the switching signal is received. The servo 98 responds to the comfirmative signal CF and maintains the switched control status and the polarity of the tracking error signal. On the other hand, the servo 98 returns to the original status when the confirmative signal CF is not received until the end time (or falling edge) of the masking signal MS (i.e., the falling edge of the second mirror pattern 80B).

Figure 19:
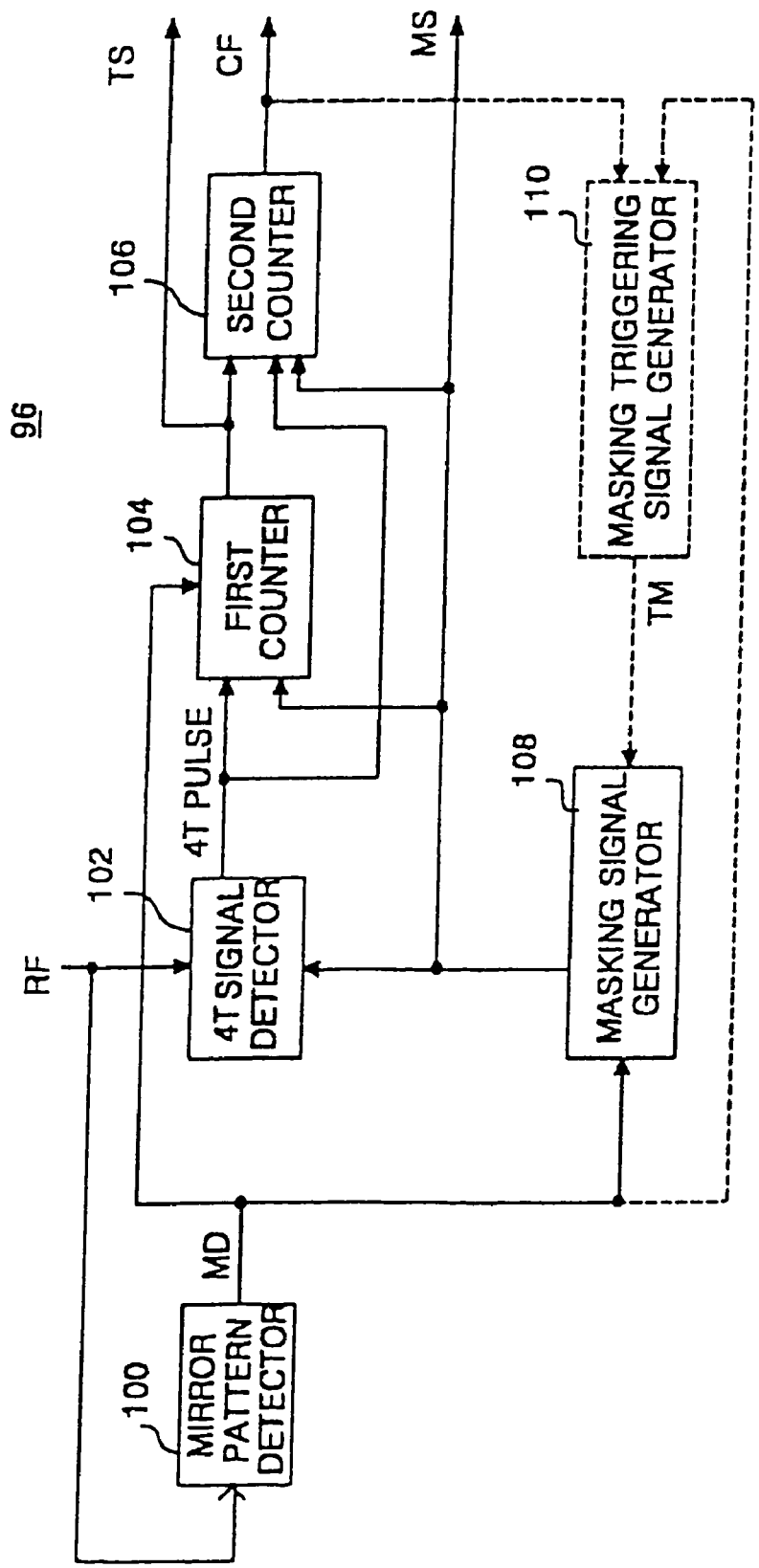
FIG. 19 is a detail block diagram of the land/groove transition information detector 96 as shown in FIG. 18.

FIG. 19 illustrates in detail the land/groove transition information detector 96 as shown in FIG. 18.

Referring to FIG. 19, the land/groove transition information detector 96 includes a mirror pattern (or region) detector 100 for detecting the first and second mirror patterns 80A and 80B included in the radio frequency signal from the signal detector 90 shown in FIG. 18, a 4T signal detector 102 for detecting spacers of 4T and recording marks of 4T of transition data pattern 82 included in the radio frequency signal RF from the signal detector 90 of FIG. 18, first and second counters 104 and 106 for counting the number of the spacers and recording marks, and a masking signal generator 108 for generating a masking signal MS. The operation of such a land/groove transition information detector 96 will be described in reference to FIG. 20.

Figure 20:
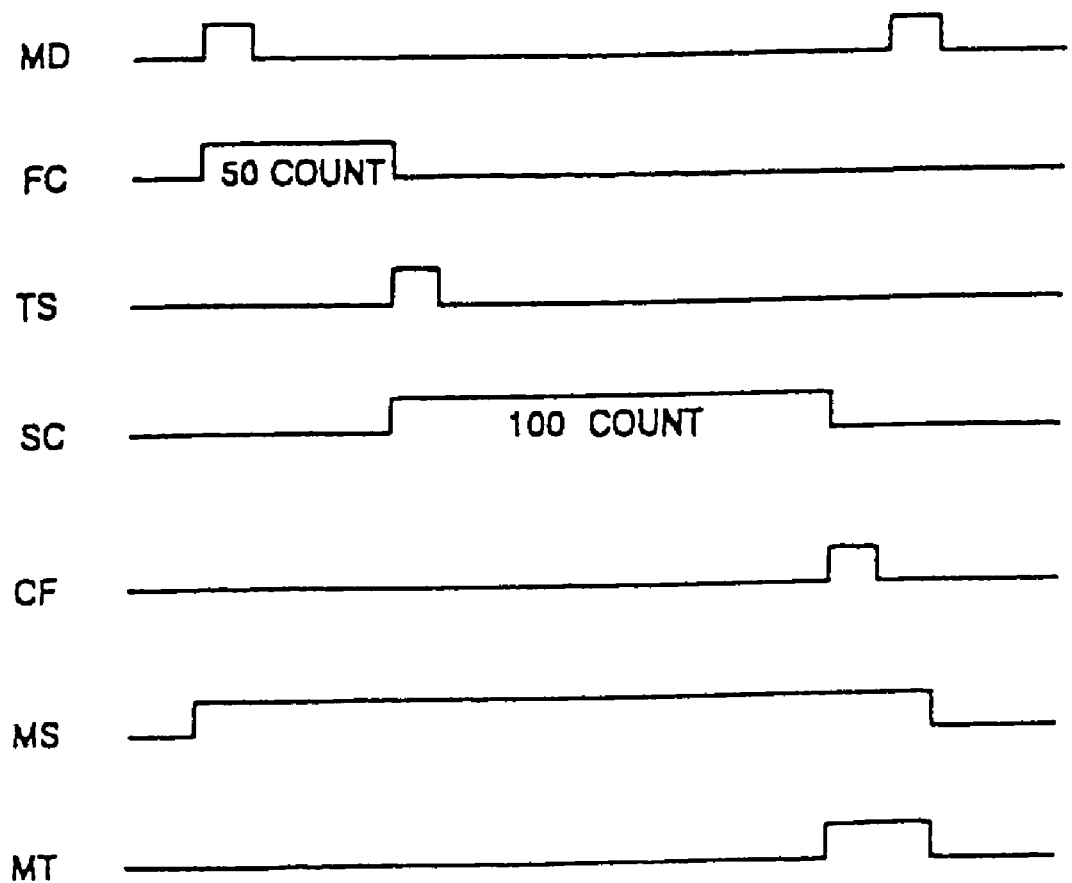
FIG. 20 is a waveform diagram showing signals generated in each the circuitry element shown in FIG. 19.

The mirror pattern detector 100 receiving the radio frequency signal RF from the signal detector 90 in FIG. 18 detects the first and second mirror patterns 80A and 80B recorded in the land/groove cross portion 76 of the optical disc. At each time which the mirror pattern 80A or 80B recorded in the land/groove cross portion 76 of the optical disc is detected, the mirror pattern detector 100 generates a mirror pattern detecting signal having a pulse of constant width. In other words, the mirror pattern detector 100 generates a first mirror pattern detecting signal responsive to the first mirror pattern 80A and a second mirror pattern detecting signal responsive to the second mirror pattern 80B. Consequently, the mirror pattern detecting signal MD generated in the mirror pattern detector 100 has a waveform as shown in FIG. 20. The mirror pattern detecting signal MD is applied to the masking signal generator 108 and the first counter 104.

The masking signal generator 108 responds to the mirror pattern detecting signal MD to generates the masking signal MS as shown in FIG. 20. The masking signal MS has a pulse which maintains a first logic level during the period proceeding from a starting point (i.e., a rising edge) of the first mirror pattern 80A to an end point (i.e., a falling edge) of the second mirror pattern 80B. In other words, the masking signal changes to the first logic level or value (for example, a high logic level) when the first mirror pattern 80A is detected. The masking signal is transited from the first logic level to a second logic level or value (for example, a low logic level) when the second mirror pattern 80B is detected. The masking signal MS generated in the masking signal generator 108 is applied to the 4T signal detector 102 and the first and second counters 104 and 106. The masking signal MS also is supplied to the servo 98 shown in FIG. 18.

The 4T signal detector 102 detects the spacer 84 of 4T and the recording mark 86 of 4T included in the radio frequency signal RF from the signal detector 90 of FIG. 18 when the masking signal MS from the masking signal generator 108 is received. In other words, the 4T signal detector 102 performs the detecting operation of the spacer and recording mark while the masking signal MS maintains the specific logic level (i.e., the high logic level). The 4T signal detector 102 generates a 4T pulse signal (not shown) at each time which the spacer of 4T and the recording mark of 4T are detected. The 4T pulse signal generated in the 4T signal detector 102 is applied to the first and second counters 104 and 106.

The first counter 104 performs a counting operation of the 4T pulse signal during the interval of the first logic level (i.e., the high logic level) of the masking signal MS. The first counter 104 starts the counting operation of the 4T pulse signal at the starting point (for example, the raising edge) of the mirror pattern detecting signal MD. In other words, the first counter 104 starts the counter operation of the 4T pulse signal when the first mirror pattern 80A is detected. In the counting operation, the first counter 104 counts the 4T pulse signal received from the 4T signal detector 102 and generates the switching signal TS of pulse shape as shown in FIG. 20 when a counted value arrives at a first predetermined value (for example, 50). The switching signal TS generated in the first counter 104 is applied to the second counter 106 and the servo 98 shown in FIG. 18. The servo 98 responds to the switching signal TS from the first counter 104 and inverts the polarity of the tracking error signal.

The second counter 106 performs the counting operation of the 4T pulse signal during the interval of the first logic level (i.e., the high logic level) of the masking signal MS. The second counter 106 starts the counting operation of the 4T pulse signal at the starting point (for example, the raising edge) of the switching signal TS. In the counting operation, the second counter 106 counts the 4T pulse signal received from the 4T signal detector 102 and generates a comfirmative signal CF of pulse shape as shown in FIG. 20 when a counted value arrives at a second predetermined value (for example, 100). The confirmative signal CF generated in the second counter 106 is applied to the masking signal generator 108 and the servo 98 shown in FIG. 18. The servo 98 responds to the comfirmative signal CF and maintains a switched status. Meanwhile, the servo 98 returns to the original status when the confirmative signal CF is not received until the end time (or falling edge) of the masking signal MS (i.e., the falling edge of the second mirror pattern 80B).

The land/groove transition information detector 84 can further include a mask-triggering signal generator 110 for generating a mask-triggering signal TM. The mask triggering signal generator 110 responds to the confirmative signal CF from the second counter 106 and the mirror pattern detecting signal MD from the mirror pattern detector 100 and generates the mask triggering signal TM to be applied to the masking signal generator 108. The mask-triggering signal is a pulse maintaining a first logic level (i.e., a high logic level) from the starting point of the confirmative signal CF to the end point of the second mirror pattern 80B, as shown in FIG. 20. The masking signal generator 108 responds to the mask triggering signal TM and forces the masking signal MS to change from the specific logic level (i.e., the high logic level) to a second logic level (for example, a low logic level), at the end time (i.e., the falling edge) of the mask triggering signal TM.

As described above, when an optical disc, in which the same-phase wobbling area 24A and the different-phase wobbling area 24B are formed as shown in FIG. 3, is accessed, or when an optical disc, in which the same-phase wobbling area 34A, the different-phase wobbling area 34B and the pre-wobbling and post-wobbling areas 34C and 34D are formed as shown in FIG. 8, is accessed, the information recording/reproducing apparatus detects the identification code, the recording clock and the rotation speed information from the same-phase component in the wobbling signal W and processes the different-phase wobbling component as errors. Accordingly, the information is recorded the information at all of the same-phase and the difference-phase wobbling areas in the optical disc as shown in FIG. 3 and FIG. 8, by the information recording/reproducing apparatus. Further, when an optical disc, in which the same-phase wobbling area 34A, the different-phase wobbling area 34B and the pre-wobbling and post-wobbling areas 34C and 34D are formed as shown in FIG. 8, is accessed, the information recording/reproducing apparatus performs rapidly and accurately the recording and reproducing of the information on the basis of the synchronous patterns detected from each of the pre-wobbling area 34C and the post-wobbling area 34D. As a result, the optical discs in which land and groove tracks are wobbled as shown in FIG. 3 and FIG. 8, can be accessed by the conventional information recording/reproducing apparatus. Furthermore, the optical discs in which the wobbling areas as shown in FIG. 3 and FIG. 8 are formed in the land and groove signal tracks are changeably used for the existing optical discs in which the wobbling areas as shown in FIG. 1 and FIG. 2 are formed therein.

As described above, in the recording medium according to the present invention, the same-phase wobbling area and the different-phase wobbling area are alternately arranged in each of the respective land and groove tracks, and the ID information of the address information and so on is preformatted on the same-phase wobbling area. In such recording medium, the information is recorded on all of the same-phase wobbling area and the difference-phase wobbling area by the synchronous pattern on the same-phase wobbling area so that the information is recorded in all of the land and groove signal tracks without a waste of the recordable area. Accordingly, the recording medium according to the present invention is capable of maximizing the recording capacity.

Also, since the pre-wobbling area and the post-wobbling area having the synchronous pattern are further provided, the recording medium according to the present invention can be rapidly and accurately accessed.

Furthermore, in the optical disc of land/groove recording system according to the present invention, the frame information indicating the land/groove cross portion is preformatted on a data area between the physical address PID and the synchronous signal. On the other hand, the information, which is against to the bi-phase modulating regulation, indicating the land/groove cross portion is included in a synchronous signal which is positioned at the front or the before of the starting or end portion of the land or groove track. Therefore, the optical disc of land/groove recording system according to the present invention allows the land/groove cross portion to be identified. The optical recording/reproducing apparatus of present invention detects the land/groove transition information preformatted on the disc and controls accurately the tracking servo and etc. on the basis of the land/groove transition information. As a result, The optical recording/reproducing apparatus can record and reproduce the information on the land and groove tracks which are alternately formed on the optical disc.

In addition, the optical disc of land/groove recording system according to the present invention has the land/groove transition information preformatted between the starting positions of the land and groove tracks and the end positions of the groove and land tracks to allow the land/groove cross portion (or line) to be accurately identified. Accordingly, the optical disc of land/groove recording system prevents noises from including in the radio frequency signal when the land/groove cross portion (or line) is accessed. The apparatus of recording/reproducing the optical disc of land/groove recording system detects the land/groove transition information preformatted on the disc and controls accurately the servo. As a result, The apparatus of recording/reproducing the optical disc of land/groove recording system can detect accurately the radio frequency signal from the land/groove cross portion.

Although the present invention has been explained by the embodiments shown in the drawings described above, it should be understood to the ordinary skilled person in the art that the invention is not limited to the embodiments, but rather than that various changes or modifications thereof are possible without departing from the spirit of the invention. For example, although optical discs has been used in the embodiments of the present invention, it should be understood to the ordinary skilled person in the art that the present invention is applicable to an optical magnetic disc. Accordingly, the scope of the invention shall be determined only by the appended claims and their equivalents.

What is claimed is:

1. A recording medium, comprising:
   a land track, and a groove track alternated with the land track, wherein the land track and groove track are wobbled in a predetermined frequency; and
   a control information pre-recorded and modulated in a wobble of at least one of the land and the groove tracks, wherein the control information includes a physical address to indicate a current location of a corresponding data unit and an identification information to indicate whether a current track is a land track or a groove track.

2. The recording medium of claim 1, wherein the control information further includes first information for indicating a number of data units to a next transition from the land track to the groove track or from the groove track to the land track.

3. The recording medium of claim 2, wherein the first information represents a number of control information from the corresponding data unit to a transition between the land and groove tracks.

4. The recording medium of claim 1, wherein the control information further includes second information for indicating whether the control information is valid or not.

5. The recording medium of claim 1, wherein the control information is positioned between a pre-synchronous pattern and a post-synchronous pattern.

6. The recording medium of claim 1, wherein the control information further includes an error detecting code to detect an error in the physical address and the identification information.

7. The recording medium of claim 1, wherein the control information is included in a predetermined interval.

8. The recording medium of claim 1, further comprising:
   a same phase wobbling area; and
   a different phase wobbling area adjacent to the same phase wobbling area,
   wherein the control information area is located at the same phase wobbling area.

9. The recording medium of claim 8, further comprising a pre-wobbling area followed by the same phase wobbling area, the pre-wobbling area including sync pattern data.

10. The recording medium of claim 9, further comprising a post-wobbling area following the same phase wobbling area, the post-wobbling area including sync pattern data.

11. The recording medium of claim 1, further comprising:
    a pre-wobbling area followed by a same phase wobbling area; and
    a post-wobbling area followed by a different phase wobbling area,
    wherein each of the pre-wobbling area and the post-wobbling area includes sync pattern data modulated in wobble, and
    wherein the control information is located at the same phase wobbling area.

12. An information recording/reproducing apparatus, comprising:
    a signal detector to detect a wobbling signal pre-recorded in a land track or a groove track of a recording medium, the wobbling signal including control information including address information to indicate a physical position of a data unit and a an identification information to indicate whether a current track is a land track or a groove track;
    a control information detector for receiving the wobbling signal from the signal detector, and detecting the control information from the wobbling signal; and
    a recording processor for controlling recording on the land track or groove track of the recording medium based on the detected control information.

13. The apparatus of claim 12, further comprising a tracking controller for controlling a tracking servo in the land or groove track identified based on the identification information, by inverting a polarity of a tracking error signal.

14. The apparatus of claim 12, further comprising a reproducing processor for controlling recording on the recording medium based on the detected control information.

* * * * *